US008019749B2

(12) United States Patent
Leban

(10) Patent No.: US 8,019,749 B2
(45) Date of Patent: Sep. 13, 2011

(54) SYSTEM, METHOD, AND USER INTERFACE FOR ORGANIZING AND SEARCHING INFORMATION

(76) Inventor: Roy Leban, Redmond, WA (US)

( * ) Notice: Subject to any disclaimer, the term of this patent is extended or adjusted under 35 U.S.C. 154(b) by 0 days.

(21) Appl. No.: 12/433,596

(22) Filed: Apr. 30, 2009

(65) Prior Publication Data

US 2010/0082634 A1    Apr. 1, 2010

Related U.S. Application Data

(60) Division of application No. 11/398,127, filed on Apr. 5, 2006, now abandoned, which is a continuation-in-part of application No. 11/384,076, filed on Mar. 17, 2006, now abandoned.

(60) Provisional application No. 60/662,751, filed on Mar. 17, 2005, provisional application No. 60/668,318, filed on Apr. 5, 2005.

(51) Int. Cl.
*G06F 17/30* (2006.01)

(52) U.S. Cl. ...................................... 707/713; 707/725
(58) Field of Classification Search .......... 707/705–709, 707/713, 722–725, 732–734
See application file for complete search history.

(56) References Cited

U.S. PATENT DOCUMENTS

| 5,515,488 | A  | * | 5/1996  | Hoppe et al. ................... 345/440 |
| 2002/0198875 | A1 | * | 12/2002 | Masters ........................... 707/4 |
| 2004/0172415 | A1 | * | 9/2004  | Messina et al. ............ 707/104.1 |
| 2005/0203878 | A1 | * | 9/2005  | Brill et al. ........................ 707/3 |
| 2005/0245274 | A1 | * | 11/2005 | Oishi et al. ................. 455/456.5 |

* cited by examiner

*Primary Examiner* — Cam-Linh Nguyen
(74) *Attorney, Agent, or Firm* — ÆON Law; Adam L.K. Philipp

(57) ABSTRACT

A computer-implemented system, method, and user interface for searching and organizing information, particularly large information sets such as those found on the Internet and World Wide Web. Information is organized and searched according to content, and this organization is reflected directly in the user interface provided to users for searching as well as the search results they are shown.

18 Claims, 43 Drawing Sheets

◉ SEARCH AGAIN:   ○ NEW SEARCH:   ☒ GRAPHICAL RESULTS

KRYPTON ▶ [        ]   ❓

RESULTS FOR KRYPTON     SHOW AS LISTS

FORMAT:  [ VENN DIAGRAM ▼ ]

❗⊖ GAS (32,000 PAGES)
SHOW THIS

ESPECIAL GAS
INC.: KRYPTON

❗⊖ ELEMENT
(28,600 PAGES)
SHOW THIS

IT'S ELEMENTAL - THE
ELEMENT KRYPTON

❗⊖ SUPERMAN
(17,900 PAGES)
SHOW THIS

TV ACRES: OUTER SPACE
ALIENS > KAL-EL FROM
KRYPTON (SUPERMAN)

❗⊖ PUZZLES
(5,620 PAGES)
SHOW THIS

HEROES TUB,
SMASHED

❗ SPONSORED LINKS
BIOLOGY BOOKS ON AMAZON

❗ OTHER RESULTS
❌ PHOTOGRAPHY    3,000
❌ KRYPTON, KY    494
❌ REDMOND, WA    144
OTHER: [        ] ❓

❗ MORE LIKE ...
MORE  RECENT   LESS  RECENT
      LOCAL          LOCAL
      NEWS           NEWS
OTHER DIRECTIONS ...

❗ CURRENT SEARCH
➡ KRYPTON
  • GAS (32,000)
    • NOBLE GAS
    • BULBS, LIGHT
    • LASER
  • ELEMENT (28,600)
    • PERIODIC TABLE
    • PLANET
    • PICTURE
  • SUPERMAN (17,900)

Fig. 15

⦿ SEARCH AGAIN:   ○ NEW SEARCH:   ☒ GRAPHICAL RESULTS

KRYPTON ▶ [          ]   ❓

RESULTS FOR KRYPTON   SHOW AS LISTS

FORMAT:   [ VENN DIAGRAM ▼ ]

❗⊖ GAS (32,000 PAGES)
SHOW THIS

ESPECIAL GAS
INC.: KRYPTON

❗⊖ ELEMENT
(28,600 PAGES)
SHOW THIS

IT'S ELEMENTAL - THE
ELEMENT KRYPTON

❗⊖ SUPERMAN
(17,900 PAGES)
SHOW THIS

TV ACRES: OUTER SPACE
ALIENS > KAL-EL FROM
KRYPTON (SUPERMAN)

❗⊖ PHOTOGRAPHY
(3,000 PAGES)
SHOW THIS

VISUAL ELEMENTS:
KRYPTON

❗ SPONSORED LINKS
BIOLOGY BOOKS ON AMAZON

❗ OTHER RESULTS
❌ PUZZLES         5,620
❌ KRYPTON, KY      494
❌ REDMOND, WA      144
OTHER: [   ]  ❓

❗ MORE LIKE ...
MORE  RECENT   LESS  RECENT
      LOCAL          LOCAL
      NEWS           NEWS
OTHER DIRECTIONS ...

❗ CURRENT SEARCH
➡ KRYPTON
  • GAS (32,000)
    • NOBLE GAS
    • BULBS, LIGHT
    • LASER
  • ELEMENT (28,600)
    • PERIODIC TABLE
    • PLANET
    • PICTURE
  • SUPERMAN (17,900)

Fig. 16

○ SEARCH AGAIN:   ○ NEW SEARCH:   ☒ GRAPHICAL RESULTS

KRYPTON ▶ [            ]   ❓

RESULTS FOR KRYPTON   SHOW AS LISTS

FORMAT:   [VENN DIAGRAM ▼]

❗⊖ GAS (32,000 PAGES)
SHOW THIS

ESPECIAL GAS INC.: KRYPTON

❗⊖ PHOTOGRAPHY
(3,000 PAGES)
SHOW THIS

VISUAL ELEMENTS:
KRYPTON

❗⊖ SUPERMAN
(17,900 PAGES)
SHOW THIS

TV ACRES: OUTER SPACE
ALIENS > KAL-EL FROM
KRYPTON (SUPERMAN)

❗ SPONSORED LINKS
BIOLOGY BOOKS ON AMAZON

❗ OTHER RESULTS
   ⊕ ELEMENT          28,600
   ⊕ PUZZLES           5,620
   ⊕ KRYPTON, KY         494
   ⊕ REDMOND, WA         144
OTHER: [         ] ❓

❗ MORE LIKE ...
MORE  RECENT   LESS  RECENT
      LOCAL          LOCAL
      NEWS           NEWS
OTHER DIRECTIONS ...

❗ CURRENT SEARCH
➡ KRYPTON
   • GAS (32,000)
      • NOBLE GAS
      • BULBS, LIGHT
      • LASER
   • ELEMENT (28,600)
      • PERIODIC TABLE
      • PLANET
      • PICTURE

Fig. 17

◉ SEARCH AGAIN:   ○ NEW SEARCH:   ☒ GRAPHICAL RESULTS
KRYPTON ▶ [            ]  ❓

RESULTS FOR KRYPTON   SHOW AS LISTS

FORMAT: [CROSS-REFERENCE MAP ▼]

| ❗⊖ GAS (32,000 PAGES) SHOW THIS | ❗⊖ ELEMENT (28,600 PAGES) SHOW THIS | ❗⊖ SUPERMAN (17,900 PAGES) SHOW THIS | ❗⊖ PUZZLES (5,620 PAGES) SHOW THIS |
|---|---|---|---|
| GAS | ❗ 8,040 PAGES SHOW THIS | ❗ 982 PAGES SHOW THIS | ❗ 960 PAGES SHOW THIS |
|  | ELEMENT | ❗ 1,080 PAGES SHOW THIS | ❗ 962 PAGES SHOW THIS |
|  |  | SUPERMAN | ❗ 907 PAGES SHOW THIS |

❗ SPONSORED LINKS
BIOLOGY BOOKS ON AMAZON

❗ OTHER RESULTS
❌ PHOTOGRAPHY   3,000
❌ KRYPTON, KY   494
❌ REDMOND, WA   144
OTHER: [       ] ❓

❗ MORE LIKE ...
MORE  RECENT    LESS  RECENT
      LOCAL           LOCAL
      NEWS            NEWS
OTHER DIRECTIONS ...

❗ CURRENT SEARCH
➡ KRYPTON
  • GAS (32,000)
    • NOBLE GAS
    • BULBS, LIGHT
    • LASER
  • ELEMENT (28,600)
    • PERIODIC TABLE
    • PLANET
    • PICTURE
  • SUPERMAN (17,900)

Fig. 19

⊙ SEARCH AGAIN:   ○ NEW SEARCH:   ☒ GRAPHICAL RESULTS

KRYPTON ▶ [        ]   ❓

RESULTS FOR KRYPTON   SHOW AS LISTS
_____

FORMAT: [ CROSS-REFERENCE MAP ▼ ]

| ❗⊖ | ❗⊖ | ❗⊖ | ❗⊖ |
|---|---|---|---|
| GAS (32,000 PAGES) SHOW THIS | ELEMENT (28,600 PAGES) SHOW THIS | SUPERMAN (17,900 PAGES) SHOW THIS | PHOTOGRAPHY (3,000 PAGES) SHOW THIS |
| GAS | ❗ 8,040 PAGES SHOW THIS | ❗ 982 PAGES SHOW THIS | ❗ 1,040 PAGES SHOW THIS |
|  | ELEMENT | ❗ 1,080 PAGES SHOW THIS | ❗ 965 PAGES SHOW THIS |
|  |  | SUPERMAN | ❗ 646 PAGES SHOW THIS |

❗ SPONSORED LINKS

BIOLOGY BOOKS ON AMAZON

❗ OTHER RESULTS

✖ PUZZLES     5,620
  ✖ KRYPTON, KY     494
  ✖ REDMOND, WA     144

OTHER: [        ] ❓

❗ MORE LIKE ...

MORE RECENT   LESS RECENT
    LOCAL           LOCAL
    NEWS           NEWS

OTHER DIRECTIONS ...

❗ CURRENT SEARCH

➡ KRYPTON
- GAS (32,000)
  - NOBLE GAS
  - BULBS, LIGHT
  - LASER
- ELEMENT (28,600)
  - PERIODIC TABLE
  - PLANET
  - PICTURE
- SUPERMAN (17,900)

Fig. 20

⦿ SEARCH AGAIN:　○ NEW SEARCH:　☒ GRAPHICAL RESULTS
KRYPTON ▶ [          ] ❓

RESULTS FOR KRYPTON　SHOW AS LISTS

FORMAT: [CROSS-REFERENCE MAP ▼]

| ❗⊖ GAS (32,000 PAGES) SHOW THIS | ❗⊖ SUPERMAN (17,900 PAGES) SHOW THIS | ❗⊖ PHOTOGRAPHY (3,000 PAGES) SHOW THIS |
|---|---|---|
| GAS | ❗ 982 PAGES SHOW THIS | ❗ 1,040 PAGES SHOW THIS |
|  | SUPERMAN | ❗ 646 PAGES SHOW THIS |

❗ SPONSORED LINKS
BIOLOGY BOOKS ON AMAZON

❗ OTHER RESULTS
　⊕ ELEMENT　　28,600
　⊕ PUZZLES　　5,620
　⊕ KRYPTON, KY　494
　⊕ REDMOND, WA　144
OTHER: [        ] ❓

❗ MORE LIKE ...
MORE RECENT　LESS RECENT
　　LOCAL　　　　LOCAL
　　NEWS　　　　NEWS
OTHER DIRECTIONS ...

❗ CURRENT SEARCH
➡ KRYPTON
　• GAS (32,000)
　　• NOBLE GAS
　　• BULBS, LIGHT
　　• LASER
　• ELEMENT (28,600)
　　• PERIODIC TABLE
　　• PLANET
　　• PICTURE

Fig. 21

● SEARCH AGAIN:   ○ NEW SEARCH:   ☒ GRAPHICAL RESULTS
[KRYPTON SUPERMAN]   ❓

RESULTS FOR KRYPTON SUPERMAN    SHOW AS LISTS 170  171        172        173         FORMAT:    [VENN DIAGRAM ▼]

❗ COMICS (9,150 PAGES)  EXPLORE THIS  CLOSE THIS

AMAZON.COM: VIDEO: SUPERMAN - THE LAST SON OF KRYPTON (1990)
SUPERMAN THE LAST SON OF KRYPTON, SCOTT JERALDS, BRUCE W. TIMM, CURT GEDA, DAN RIBA, ... SPIRIT-CAPTURING TRANSLATION OF THE EPIC SUPERMAN COMICS ...
HTTP://WWW.AMAZON.COM/...6304139721?V=GLANCE

AMAZON.COM: BOOKS: SUPERMAN, LAST SON OF KRYPTON
... RELEASE OF SUPERMAN THE MOVIE, THE LAST SON OF KRYPTON TELLS THE ORIGIN OF ... I'M A SUPERMAN COMIC-BOOK READER SINCE 1990 AND THIS BOOK, EVEN THOUGH IT ...
HTTP://WWW.AMAZON.COM/.../0446823198?V=GLANCE

JUSTICE SOCIETY PROFILE: SUPERMAN
... THAT NIGHT SIEGEL COMPLETED SCRIPTS FOR ENOUGH SUPERMAN COMIC STRIPS TO LAST ... STRIP (IT WAS HERE THAT SUPERMAN'S HOME PLANET WAS FIRST CALLED KRYPTON ...
HTTP://WWW.CVALLEY.NET/~CANOTE/SUPERMAN.HTML

SUPERMAN COMICS
... THESE ARE BRIGHTLY, BRILLIANTLY COLORED, LIKE EVERYTHING ELSE ON BOTH KRYPTON AND THE SUPERMAN FAMILY OF COMICS - COMICS WERE ONE OF TEH FIRST NARRATIVE ...
HTTP://MEMBERS.AOL.COM/MG4273/SUPERMAN.HTM

SUPERMAN: RETURN TO KRYPTON 2!
... SUPERMAN TITLES IN JULY 2002, TAKES SUPERMAN BACK TO A SILVER AGE KRYPTON. ... SUPERMAN: THE MAN OF STEEL #128 ACTION COMICS #793. SUPERMAN #184 ...
HTTP://WWW.DCCOMICS.COM/FEATURES/RTKW

174

❗ SPONSORED LINKS
BUY DC COMICS ON EBAY

❗ OTHER RESULTS
❌ PUZZLES          690
❌ PHOTOGRAPHY      664
❌ REDMOND, WA       11
OTHER: [          ]  ❓

❗ MORE LIKE ...
MORE  RECENT   LESS  RECENT
      LOCAL          LOCAL
      NEWS           NEWS
OTHER DIRECTIONS ...

❗ CURRENT SEARCH
➡ KRYPTON SUPERMAN
  • COMICS (32,000)
      • MOVIES
      • SUPER
      • RETURN TO KRYPTON
  • PLANET (7,290)
      • CLARK KENT
      • REVIEWS
      • JOR
  • HERO (6,750)

Fig. 23

○ SEARCH AGAIN: ○ NEW SEARCH: ☒ GRAPHICAL RESULTS

[KRYPTON SUPERMAN] ❓

RESULTS FOR KRYPTON SUPERMAN    SHOW AS LISTS

FORMAT: [CROSS-REFERENCE MAP ▼]

❗ COMICS (9,150 PAGES)  EXPLORE THIS  CLOSE THIS

AMAZON.COM: VIDEO: SUPERMAN - THE LAST SON OF KRYPTON (1990)
SUPERMAN THE LAST SON OF KRYPTON, SCOTT JERALDS, BRUCE W. TIMM, CURT GEDA, DAN RIBA, ... SPIRIT-CAPTURING TRANSLATION OF THE EPIC SUPERMAN COMICS ...
HTTP://WWW.AMAZON.COM/...6304139721?V=GLANCE

AMAZON.COM: BOOKS: SUPERMAN, LAST SON OF KRYPTON
... RELEASE OF SUPERMAN THE MOVIE, THE LAST SON OF KRYPTON TELLS THE ORIGIN OF ... I'M A SUPERMAN COMIC-BOOK READER SINCE 1990 AND THIS BOOK, EVEN THOUGH IT ...
HTTP://WWW.AMAZON.COM/.../0446823198?V=GLANCE

JUSTICE SOCIETY PROFILE: SUPERMAN
... THAT NIGHT SIEGEL COMPLETED SCRIPTS FOR ENOUGH SUPERMAN COMIC STRIPS TO LAST ... STRIP (IT WAS HERE THAT SUPERMAN'S HOME PLANET WAS FIRST CALLED KRYPTON ...
HTTP://WWW.CVALLEY.NET/~CANOTE/SUPERMAN.HTML

SUPERMAN COMICS
... THESE ARE BRIGHTLY, BRILLIANTLY COLORED, LIKE EVERYTHING ELSE ON BOTH KRYPTON AND THE SUPERMAN FAMILY OF COMICS - COMICS WERE ONE OF TEH FIRST NARRATIVE ...
HTTP://MEMBERS.AOL.COM/MG4273/SUPERMAN.HTM

SUPERMAN: RETURN TO KRYPTON 2!
... SUPERMAN TITLES IN JULY 2002, TAKES SUPERMAN BACK TO A SILVER AGE KRYPTON. ... SUPERMAN: THE MAN OF STEEL #128 ACTION COMICS #793. SUPERMAN #184 ...
HTTP://WWW.DCCOMICS.COM/FEATURES/RTKW

❗ SPONSORED LINKS

BUY DC COMICS ON EBAY

❗ OTHER RESULTS

❌ PUZZLES         690
❌ PHOTOGRAPHY     664
❌ REDMOND, WA      11

OTHER: [            ] ❓

❗ MORE LIKE ...

MORE  RECENT   LESS  RECENT
      LOCAL          LOCAL
      NEWS           NEWS

OTHER DIRECTIONS ...

❗ CURRENT SEARCH

➡ KRYPTON SUPERMAN
  • COMICS (32,000)
    • MOVIES
    • SUPER
    • RETURN TO KRYPTON
  • PLANET (7,290)
    • CLARK KENT
    • REVIEWS
    • JOR
  • HERO (6,750)

RESULTS FOR "JAVA"  ●SEARCH AGAIN: ○NEW SEARCH:
                    [JAVA]

● JAVA (25,900,000 PAGES)  SHOW THIS

● PROGRAMMING (3,580,000 PAGES)

JAVA TECHNOLOGY
...CONCURRENT PROGRAMMING WITH J2SE 5.0 J2SE 5.0 PROVIDES A NEW WAY TO MULTITHREAD PROGRAMMING THROUGH THE JAVA.UTIL.CONCURRENT PACKAGE, WHICH OFFERS A....
HTTP://JAVA.SUN.COM

THE JAVA TUTORIAL
... THE JAVA TUTORIAL A PRACTICAL GUIDE FOR PROGRAMMERS ... YOUR FIRST CUP OF JAVA: DETAILED INSTRUCTIONS TO HELP YOU RUN Y OUR FIRST PROGRAM: UNIX,...
HTTP://WWW.JAVA.SUN.COM/DOCS/BOOKS/TUTORIAL

JAVA PROGRAMMING RESOURCES - JAVA, JAVA, AND MORE JAVA
JAVA PROGRAMMING RESOURCES: FAQS TUTORIALS, COMPILER AND BROWSER DOWNLOAD SITES, DOCUMENTATION, BOOKS LISTS, IDES, ETC.
HTTP://WWW.APL.JHU.EDU/.../FAQS-AND-TUTORIALS.HTML

JAVA PROGRAMMING_MAIN INDEX
A FREE JAVA PROGRAMMING TEXTBOOK BY DAVID J. ECK, AVAILABLE FOR USE ON-LINE AND FOR DOWNLOADING.
HTTP://MATH.HWS.EDU/JAVANOTES/

GAMELAN.COM - A DEVELOPER.COM SITE FOR JAVA ARTICLES. TUTORIALS
... JXTA FOR WIRELESS JAVA PROGRAMMERS BY BILAL SIDDIQUI - ... YOU SAY IF WE TOLD YOU THAT JSP PROGRAMMERS COULD PROGRAM USING TAGS RATHER THAN JAVA CODE?

● SPONSORED LINKS
BIOLOGY BOOKS ON AMAZON

● CURRENT SEARCH
↱JAVA
  ● PROGRAMMING (3,580,000)
    ● JAVA PROGRAMMING
  LANGUAGE
    ● DESIGN
    ● DATABASE
  ● APPLETS (554,000)
    ● FREE JAVA APPLETS
    ● TUTORIALS
    ● EDUCATION
  ● COFFEE (238,000)
    ● COFFEE BEANS
    ● COFFEE HOUSE
    ● CAFE
  ● PHOTOGRAPHY (217,000)
    ● DESIGN
    ● SOFTWARE
    ● ARTS PHOTOGRAPHY
  ● PUZZLES (195,000)
    ● CROSSWORD
    ● JIGSAW
    ● APPLET
  ● ISLAND OF JAVA (9,100)

Fig. 28

○ SEARCH AGAIN: ○ NEW SEARCH:
HUMAN GENOME

RESULTS FOR "HUMAN GENOME"
203  201

● HUMAN GENOME (1,970,000 PAGES)  SHOW THIS
201

● BIOLOGY (476,000 PAGES)

NCBI HOMEPAGE
...AND PUBMED CENTRAL MOLECULAR DATABASES SEQUENCES, STRUCTURES, AND TAXONOMY GENOMIC BIOLOGY THE HUMAN GENOME, WHOLE GENOMES, AND RELATED RESOURCES TOOLS DATA ...
HTTP://WWW.NCBI.NIM.NIH.GOV

NCBI HUMAN GENOME RESOURCES
... TITLES OF SELECTED CHAPTERS THAT REFER TO HUMAN GENOME RESOURCES ARE SHOWN BELOW ... HOW IS THE HUMAN GENOME ASSEMBLED AND ANNOTATED? ...
HTTP://WWW.NCBI.NIM.NIH.GOV//GENOME/GUIDE

HUMAN GENOME RESEARCH
... HUMAN GENOME PROGRAM HAVE INCLUDED STUDIES OF THE ETHICAL, LEGAL, AND SOCIAL IMPLICATIONS (ELSI) OF GENOME RESEARCH; BIOINFORMATICS AND COMPUTATIONAL BIOLOGY; ...
HTTP://WWW.SCIENCE.DOE.GOV/OBEOHUG_TOP.HTML

THE GDB HUMAN GENOME DATABASE
... OFFICIAL WORLD-WIDE DATABASE FOR THE ANNOTATION OF THE HUMAN GENOME HOSTED BY ... SIMPLE SEARCH SEARCH: BY: GENOMIC SEGMENTS ALL BIOLOGICAL DATA PEOPLE ...
HNTTP://GDBWWW.GDB.ORG/

● HUMAN GENOME PROJECT (187,000 PAGES)

ENSEMBL GENOME BROWSER
ENSEMBL GENOME BROWSER. SEARCH ENSEMBL. SEARCH ALL SPECIES FOR ANYTHING ...
HTTP://WWW.ENSEMBL.ORG

BROAD INSTITUTE
... RESEARCHES FIND SURPRISING DIFFERENCE BETWEEN HUMAN AND CHIMP GENOMES -- 02.10.2005: MORE NEWS >> HEADLINES. R&D MAG FEATURES GENOME BROWSER ARGO ...
HTTP://WWW.BROAD.MIT.EDU

HUMAN GENOME PROJECT INFORMATION
THE MAIN HOMEPAGE FOR HUMAN GENOME PROJECT INFORMATION -- WHAT THE PROJECT IS; ITS PROGRESS, HISTORY, AND GOALS; WHAT ISSUES ARE ASSOCIATED WITH GENOME RESEARCH ...
HTTP://WWW.ORNL.GOV/SCI/TECHRESOURCES/...HOME.SHTML

DOEGENOMES.ORG--GENOME PROGRAMS OF THE US DEPARTMENT OF ENERGY
SITE OF THE US HUMAN GENOME PROJECT, GENOMICS:GTL PROGRAM, AND MICROBIAL GENOME PROGRAM--ALL SPONSORED BY THE US DEPARTMENT OF ENERGY GENOME PROGRAMS ...
HTTP://WWW.ORNL.GOV/SCI/TECHRESOUR

● SPONSORED LINKS
BIOLOGY BOOKS ON AMAZON

● CURRENT SEARCH

...JAVA
  • APPLETS
  • PROGRAMMING
  • COFFEE
  • ISLAND OF JAVA
HUMAN GENOME
  • BIOLOGY (476,000)
    • HUMAN GENOME PROJECT
    • GENOME SEQUENCING
    • MOLECULAR BIOLOGY
  • HUMAN GENOME PROJECT (187,000)
  • MAP
    • GENOME RESEARCH
    • BIOLOGY
    • GENOME RESEARCH (120,000)
    • DEPARTMENT, ENERGY
    • DATABASE
    • GENOME CENTER
  • PUZZLES (15,900)
    • HEALTH
    • BIOLOGY
    • NATIONAL HUMAN

- PHOTOGRAPHY (12,400)
  - BOOKS
  - HUMAN GENOME MAP
  - UNIVERSITY
  - MAPPING THE HUMAN GENOME (3,680)
  - GENOME RESEARCH
  - BOOKS
  - FINISH
- REDMOND, WA (525)
  - HUMAN GENOME PROJECT
  - HUMAN GENOME SCIENCES
  - ANALYSIS

! MORE LIKE ...

MORE RECENT LESS RECENT
LOCAL LOCAL
NEWS NEWS

OTHER DIRECTIONS ...

[[RELATED RESULTS]]

LLNL HUMAN GENOME CENTER
... SEQUENCE-READY MAP OF HUMAN CHROMOSOME 19 ... DNA REPAIR, INDIVIDUAL SUSCEPTIBILITY, STRUCTURAL BIOLOGY, AND MICROBIAL ... THE FORMATION OF A JOINT GENOME INSTITUTE FOR ...
HTTP://WWW-BIO.LLNL.GOV/BBRP/.../GENOME.HTML

GENOME GLOSSARY
... OFFICE OF SCIENCE SITE SPONSORED BY THE US DEPARTMENT OF ENERGY OFFICE OF SCIENCE, OFFICE OF BIOLOGICAL AND ENVIRONMENTAL RESEARCH, HUMAN GENOME PROGRAM.
HTTP://WWW.ORNL.GOV/SCI/TECHRESOURCES/HUMAN_GENOME/.../

HUMAN GENOME PROJECT IN THE YAHOO! DIRECTORY
... GENOME SCIENCES DEPARTMENT - LAWRENCE BERKELEY NATIONAL LABORATORY - IDENTIFIES GENES AND DETERMINES THEIR FUNCTIONS IN THE CONTEXT OF BIOLOGY AND HUMAN ...
HTTP://DIR.YAHOO.COM/SCIENCE/BIOLOGY/GENETICS/.../

THE INSTITUTE FOR GENOMIC RESEARCH
... GENES THAT CONTRIBUTE TO THE ORGANISM'S UNIQUE BIOLOGY ... SEQUENCE A LARGE NUMBER OF HUMAN ISOLATES OF ... PART OF A LANDMARK INFLUENZA GENOME SEQUENCING PROJECT ...
HTTP://WWW.TIGR.ORG/

GENOME BIOLOGY | FULL TEXT | A COMPREHENSIVE TRANSCRIPT INDEX OF ...
... COMPREHENSIVE TRANSCRIPT INDEX OF THE HUMAN GENOME GENERATED USING ...
5-10-R73

CES/HUMAN_GENOME/

HUMAN GENOME RESEARCH
... THE US HUMAN GENOME PROJECT (HGP), COMPOSED OF THE DOE AND NIH HUMAN GENOME PROGRAMS, IS THE NATIONAL COORDINATED EFFORT TO CHARACTERIZE ALL HUMAN GENETIC ...
HTTP://WWW.SCIENCE.DOE.GOV/OBER/HUG_TOP.HTML

SHGCTEST
... 20 OCTOBER 2004. THE FINISHED HUMAN GENOME ... WE ARE PLEASED TO ANNOUNCE THE PUBLICATION OF THE HUMAN GENOME SEQUENCE QUALITY ASSESSMENT IN THE JOURNAL NATURE ...
HTTP://WWW.SNGC.STANFORD.EDU/

NCBI HUMAN GENOME RESOURCES
... FACING RESEARCHERS TODAY IS THAT OF PIECING TOGETHER AND ANALYZING THE PLETHORA OF DATA CURRENTLY BEING GENERATED THROUGH THE HUMAN GENOME PROJECT AND SCORES ...
HTTP://WWW.NCBI.NIH.GOV/GENOME/GUIDE/

GENOME.GOV | NATIONAL HUMAN GENOME RESEARCH INSTITUTE
... THE NATIONAL HUMAN GENOME RESEARCH INSTITUTE LED THE HUMAN GENOME PROJECT FOR THE NATIONAL INSTITUTES OF HEALTH, WHICH CULMINATED IN THE COMPLETION OF THE FULL ...
HTTP://WWW.GENOME.GOV

Fig. 28 (continued)

RESULTS FOR "SIMPLE INHERITANCE"   ●SEARCH AGAIN:  ○NEW SEARCH:   ❓
204                                [SIMPLE INHERITANCE]

❗ SIMPLE INHERITANCE (418,000 PAGES)  SHOW THIS

❗ GENETICS (50,400 PAGES) | ❗ PATTERN (114,000 PAGES) | ❗ SPONSORED LINKS
---|---|---
BASIC PRINCIPLES OF GENETICS: EXCEPTIONS TO SIMPLE INHERITANCE ... THE SIMPLE MENDELIAN RULES OF INHERITANCE DESCRIBED HERE ... GENES THAT FOLLOW SIMPLE RULES OF DOMINANCE ... OTHER "EXCEPTIONS" TO MENDELIAN GENETICS WERE DISCOVERED ... HTTP://ANTHRO.PALOMAR.EDU/MENDEL/MENDEL_3.HTM | BASIC PRINCIPLES OF GENETICS: EXCEPTIONS TO SIMPLE INHERITANCE ... WE LEARN MORE ABOUT THE INHERITANCE PATTERNS FOR THESE TRAITS, IT IS BECOMING CLEAR THAT AT LEAST SOME OF THE TWELVE EXCEPTIONS TO THE SIMPLE MENDELIAN RULES ... HTTP://ANTHRO.PALOMAR.EDU/MENDEL/MENDEL_3.HTM | BIOLOGY BOOKS ON AMAZON

❗ CURRENT SEARCH

... JAVA
 • APPLETS
 • PROGRAMMING
 • COFFEE
 • ISLAND OF JAVA
... HUMAN GENOME
 • HUMAN GENOME PROJECT
 • GENOME RESEARCH
 • MAPPING THE HUMAN GENOME
 • BIOLOGY
SIMPLE INHERITANCE ←
 • GENETICS (50,400)
   • HUMAN GENETICS
   • COLOR COAT
   • BASIC PRINCIPLES OF GENETICS
 • PATTERN (114,000)
   • GENE
   • DESIGN
   • OBJECT
 • TAXES (57,900)
   • ESTATE PLANNING
   • INCOME TAXES

BASIC PRINCIPLES OF GENETICS: PROBABILITY OF INHERITANCE THE VALUE OF STUDYING GENETICS IS IN UNDERSTANDING HOW ... EXPLAIN AND PREDICT PATTERNS OF INHERITANCE IN FAMILY ... THIS IS A SIMPLE GRAPHICAL WAY OF DISCOVERING ALL ... HTTP://ANTHRO.PALOMAR.EDU/MENDEL/MENDEL_2.HTM | PRACTICE QUIZ FOR EXCEPTIONS TO SIMPLE INHERITANCE PRACTICE QUIZ FOR EXCEPTIONS TO SIMPLE INHERITANCE. NO. ... 8 TOES, HETEROZYGOUS ONES HAVE 7, AND HOMOZYGOUS RECESSIVE ONES HAVE 6, THE INHERITANCE PATTERN WOULD BE .... HTTP://ANTHRO.PALOMAR.EDU/MENDEL/MENDQUI3.HTM |

TOPIC 6 SIMPLE INHERITANCE - CONFLUENCE ... A MODEL STUDENTS DEVELOP A HYPOTHESIS TO EXPLAIN SIMPLE INHERITANCE CRITIQUE EVIDENCE ... | INHERITANCE PATTERNS - 1 WE KNOW THAT OUR GENETIC INFORMATION IS ... |

Fig. 29

| | |
|---|---|
| GENETIC CROSSING USING PUNNETT SQUARES STUDENTS USE ONLINE RESOURCES TO ....<br>HTTP://DOCS.TESLSCENTER.ORG/.../TOPIC+6+SIMPLE+INHERITANCE | ... A YELLOW OVERLAY GENE WHICH WHEN COMBINED WITH THE BASIC PIGMENT GENE ALTERS LIGHT BROWN TO HAZEL AND LIGHT BLUE TO GREEN. PAGE 15. INHERITANCE PATTERNS - 15 ....<br>HTTP://SCIDIV.BCC.CTC.EDU/.../INHERITANCEPATTERNS201.PDF |
| THE GENETICS OF HUMAN EYE COLOR<br>... ANY DISCUSSION OF THE INHERITANCE OF EYE COLOR, REQUIRES A REVIEW OF GENETICS. IN BASIC TERMS, EYE COLOR IS DETERMINED BY THE AMOUNT OF A PIGMENT CALLED ....<br>HTTP://WWW.SEPS.ORG/EVORACLE/.../EYECOLOR.HTML | NET 247: SIMPLE INHERITANCE QUESTION ON MICROSOFT.PUBLIC.DOTNET....<br>... NOT PART OF THE PATTERN PER SE, I HAVE TCPSTATE THROW.... THE SAME BASIC RULES APPLY TO INTERFACES.... AHH YES, BUT I MENTIONED INHERITANCE, BECAUSE I WANTED AN ....<br>HTTP://WWW.DOTNET247.COM/247REFERENCE/.../33065.ASPX |
| TONGUE-ROLLING IS NOT A SIMPLE INHERITED TRAIT<br>TONGUE-ROLLING IS NOT A SIMPLE INHERITED TRAIT. IN HIS BOOK, A HISTORY OF GENETICS (HARPER & ROW ... IMPORTANT THAT SUSPECTED CASES OF MENDELIAN INHERITANCE IN MAN ....<br>HTTP://WWW.PEOPLE.VIRGINIA.EDU/.../TONGROLL.HTML | THE CODE PROJECT - ILLUSTRATED GOF DESIGN PATTERNS IN C# PART II<br>...<br>... AS A SIMPLE EXAMPLE, CONSIDER HOW MULTIPLE INHERITANCE MIXES TWO OR .... THIS PATTERN IS PARTICULARLY USEFUL FOR MAKING INDEPENDENTLY DEVELOPED CLASS LIBRARIES....<br>HTTP://WWW.CODEPROJECT.COM/.../CSDESPAT_2.ASP |
| FELINE GENETICS LINKS<br>... INHERITANCE GENERAL THE BIOLOGY PROJECT: MENDELIAN GENETICS DIAGRAM OF SIMPLE INHERITANCE DRAG-AND-DROP GENETICS ENVIRONMENT-GENE INTERACTIONS HERITABILITY BY ....<br>HTTP://WWW.CAT-WORLD.COM.AU/GENETICS.HTM | PATTERNS OF INHERITANCE |

- FEE SIMPLE
- MULTIPLE INHERITANCE (24,700)
  - OBJECT
  - JAVA
  - INTERFACE
- PUZZLES (15,400)
  - BOOKS
  - REVIEW
  - JAVA
- PHOTOGRAPHY (11,000)
  - ART
  - PROGRAMMING
  - OBJECT
- REDMOND, WA (676)
  - MULTIPLE INHERITANCE

Fig. 29 (continued)

SIMPLE INHERITANCE (640,000 PAGES)   SHOW THIS

TAXES (86, 300 PAGES)

INHERITANCE TAX GUIDE FROM
CHANNEL4.COM/4MONEY
... HERE IS A SIMPLE EXAMPLE. MR AND MRS X HAVE
£600000 APIECE. ... THE CHILDREN ALSO INHERIT
TAX-FREE BECAUSE THEIR SHARE IS WITHIN THE IHT
THRESHOLD. ...
HTTP://WWW.CHANNEL4.COM/.../INHERITANCE_TAX_
GUIDE_101003_PAGE3.HTML

BBC NEWS | PROGRAMMES | WORKING LUNCH |
UNDERSTANDING INHERITANCE TAX
A BASIC GUIDE TO THE TAX FROM
PRICEWATERHOUSECOOPER'S JOHN WHITING. ...
WE'VE BEEN INUNDATED WITH YOUR QUERIES
ABOUT INHERITANCE TAX.
HTTP://NEWS.BBC.CO.UK/1/HI/PROGRAMMES/.../23261
23.STM

BBC NEWS | PROGRAMMES | CASHING IN |
INHERITANCE TAX
... INSTITUTE OF TAXATION, EXPLAINS EVERYTHING
BEHIND INHERITANCE TAX. ... THE BASIC
CALCULATION OF IHT IS SIMPLE - VALUE ALL THE
ASSETS THAT ARE LEFT ...
HTTP://NEWS.BBC.CO.UK/1/HI/PROGRAMMES/.../22461
55.STM

AVOIDING INHERITANCE TAX
... PEOPLE ARE PUSHED OVER THE £250000
THRESHOLD INTO INHERITANCE TAX TERRITORY, ...
PROFESSIONAL HELP IS THAT YOU ARE ALMOST
CERTAIN TO MISS OUT ON SIMPLE, ...
HTTP://MONEY.MSN.CO.UK/PLANNING/.../DEFAULT.ASP

LEGAL (166,000 PAGES)

OO/C++ FUNDAMENTALS - 12. SIMPLE
INHERITANCE
... DESIGN PRINCIPLE: DO NOT USE
INHERITANCE TO REUSE IMPLEMENTATION
(CODE). ... HERE IS A SIMPLE EXAMPLE
WHERE WE DERIVE TWO NEW CLASSES
FROM TASK ...
HTTP://WWW.CS.UALBERTA.CA/~HOOVER/.../I
NHERIT-1.HTM

PENNSYLVANIA ESTATE AND TRUST
CYBRARY (DANIEL B. EVANS, ATTORNEY)
ARTICLES AND LEGAL RESOURCES FOR
PENNSYLVANIA AND FEDERAL ESTATE ... AND
LEGAL FEES); UNDERSTANDING FIDUCIARY
ACCOUNTS; PENNSYLVANIA INHERITANCE
TAX MARITAL ...
HTTP://EVANS-LEGAL.COM/DAN/WELCOME.HT
ML

TYPE INHERITANCE
... THIS TOPIC OUTLINES THE CONCEPTS
OF TYPE INHERITANCE, AND HIGHLIGHTS
SOME ... POSSIBLE TO EXTEND A SIMPLE
TYPE BY WIDENING ITS RANGE OF LEGAL
VALUES) ...
HTTP://PUBLIB.BOULDER.IBM.COM/.../AD10430
_.HTM

[CHAPTER 18] OBJECT TYPES
... SCALAR ATTRIBUTES ARE SOMETIMES
CALLED SIMPLE, AND COMPOSITE
ATTRIBUTES MAY ... ANY

| SEARCH TERM 1010/1011 | MAPPED TERM 1020/1021 | MAP TYPE 1030/1031 |
|---|---|---|
| Britanny Spears | Britney Spears | Correction + Name |
| Britanny Speers | Britney Spears | Correction + Name |
| Britany Spears | Britney Spears | Correction + Name |
| Britany Speers | Britney Spears | Correction + Name |
| Britney Spears | Britney Spears | Name |
| Britney Speers | Britney Spears | Correction + Name |
| Brittany Spears | Britney Spears | Correction + Name |
| Brittany Speers | Britney Spears | Correction + Name |
| Brittney Spears | Britney Spears | Correction + Name |
| Brittney Speers | Britney Spears | Correction + Name |
| Chanukah | Chanukah | Alternate Spelling |
| Chanukkah | Chanukah | Alternate Spelling |
| Chris Brian Bridges | Ludacris | Name |
| Chris Bridges | Ludacris | Name |
| Chris Lova Lova | Ludacris | Name |
| Christopher Brian Bridges | Ludacris | Name |
| Christopher Bridges | Ludacris | Name |
| Coran | Quran | Alternate Spelling |
| Hanukah | Chanukah | Alternate Spelling |
| Hanukkah | Chanukah | Alternate Spelling |
| Koran | Quran | Alternate Spelling |
| Ludacris | Ludacris | Name |
| Ludicrous | Ludacris | Correction + Name |
| Ludicrous | Ludicrous/Ridiculous | Synonym |
| Nonsensical | Ludicrous/Ridiculous | Synonym |
| Preposterous | Ludicrous/Ridiculous | Synonym |
| Proposterous | Ludicrous/Ridiculous | Correction + Synonym |
| Qur'an | Quran | Alternate Spelling |
| Quran | Quran | Alternate Spelling |
| Ridiculous | Ludicrous/Ridiculous | Synonym |

SYSTEM, METHOD, AND USER INTERFACE FOR ORGANIZING AND SEARCHING INFORMATION

RELATED REFERENCES

This application is a division of U.S. patent application Ser. No. 11/398,127, filed on Apr. 5, 2006 (pending), which is a continuation in part of U.S. patent application Ser. No. 11/384,076, filed Mar. 17, 2006. This application claims the benefit of priority to U.S. Provisional Application No. 60/662,751, filed Mar. 17, 2005, and to U.S. Provisional Application No. 60/668,318, filed Apr. 5, 2005. The above-cited applications are incorporated herein by reference in their entirety, for all purposes.

FIELD

The present invention relates generally to the field of searching and organizing information and is particularly, though not exclusively, applicable to large, possibly distributed, data sets, which might be spread across an entire computer network such as the Internet and World Wide Web.

BACKGROUND

With the proliferation of billions of web sites from which billions of people wish to find information, search engines have become an essential part of using the Internet. Unfortunately, this same growth has degraded the quality of the search engines and the quality of the results that users can obtain from them. When the web consisted of only 1 million pages, a search result of $1/10$ of 1% was only 100 pages. But, with a searchable web of 10 billion pages, a mere $1/10,000$ of 1% (an infinitesimal fraction) is 10,000 pages, far more than any person can readily comprehend.

The problem is only getting worse. For example, efforts are already underway to make the entire contents of every book ever published available online.

Since a search engine can only show a fraction of an actual result set, existing search engines use various techniques to rank pages, so as to present the most relevant results first. These techniques quickly break down with a large amount of data. It is the conclusion of this inventor that any technique which fails to narrow the list of results rather than just ranking the results will inevitably fail.

The reliance of existing search engines on literal keyword searches causes users to be unable to find pages which don't have the words they're searching for, even if the pages contain the information they are looking for. Rather than specify what they want to find, users have to guess what words might appear on a page that has what they're looking for. The result is that using an existing search engine is a bit like working with an absent-minded reference librarian, who can't remember who you are or why exactly you're in the library, and keeps handing you stuff you're not interested in. You have to get more and more specific in what you're looking for and, after a while, you start wondering who's helping who.

The result of these problems is that current users of search engines spend significant amounts of time searching and re-searching in order to find the information they are looking for.

Prior art search engines treat each search independently, with no connection to previous searches, either within a session, or for a user. It is well known that one can't take over a half-played hand in game of Bridge and instantly understand what's going on because essential information is unavailable (the cards that have already been played and are no longer visible). Yet, prior art search engines are built on the premise that they can jump into the middle of a search session and know what's going on based on a single search query of a few words.

Prior art search engines have taken a number of approaches in attempts to improve results, but these approaches frequently exacerbate the problem rather than ameliorating it. For example, returning unusable or unacceptable results faster than before doesn't solve the underlying problem of unusable or unacceptable results. The same is true if the search engine finds more unusable or unacceptable results—this just makes more work for the user to sort through additional unusable or unacceptable results. Many of the approaches actually increase the work required of a user of the search engine, or slow down users of the search engine.

In summary, prior art search engines have not made headway on the difficult problem of making a search engine easier or more efficient to use. The present invention overcomes these significant disadvantages and limitations of prior art.

BRIEF SUMMARY OF THE INVENTION

The invention consists of a an improved search engine system combined with an improved search engine user interface (together an improved search system). Combined, they provide users with a significantly better search experience by giving them the ability to quickly narrow down their search without guessing words that might appear on pages, with the result being that users will feel like they have an assistant who is helping them get closer and closer to what they're actually looking for. Even within a single search session, users will feel like each item that they look at is successively closer to what they're looking for.

BRIEF DESCRIPTION OF THE DRAWINGS

While the appended claims set forth the features of the present invention with particularity, the invention, together with its objects and advantages, will be more readily appreciated from the following detailed description, taken in conjunction with the accompanying drawings, wherein:

FIG. 13 is an example of search indicators wherein the user has positioned the cursor and clicked, in order to get a menu of alternate search subsets that they can switch to.

FIGS. 14, 15, 16, and 17 are examples of search results using a Venn diagram viewer illustrating a sequence of dynamic changes to the viewer without the need to initiate a new search. Clicking the + and − buttons immediately change what is being shown, possibly retrieving information "in the background" from the search engine server, but they do not initiate a new search.

FIGS. 18, 19, 20, and 21 are examples of search results using a Cross-Reference Map viewer illustrating a sequence of dynamic changes to the viewer without the need to initiate a new search. These drawings match the sequence in FIGS. 14, 15, 16, and 17.

FIG. 23 is an example of drill-down search results which have been brought up from a Venn diagram viewer by clicking on the icon or Show This button within the search results.

FIG. 24 is an example of drill-down search results which have been brought up from a Cross-Reference Map viewer by clicking on the icon or Show This button within the search results.

FIG. 28 is an example of search results using a List viewer illustrating multiple high-likelihood subsets.

FIG. 29 is an example of search results using a List viewer illustrating a subset being shown as the highest ranking result set (and indicated as such with an icon) based on the current search history, even though there are more results in other sets.

FIG. 30B is an example of search results illustrating subsets chosen based on the predictive options specified by a user (and indicated as such with an icon), even if there are more results in other sets. This drawing matches the result of a search initiated as illustrated in FIG. 30A.

FIG. 34 is an example of a mapping table used to map search terms for expanded search capabilities via alteration, indexing, or categorization.

DESCRIPTION

Figure 1:
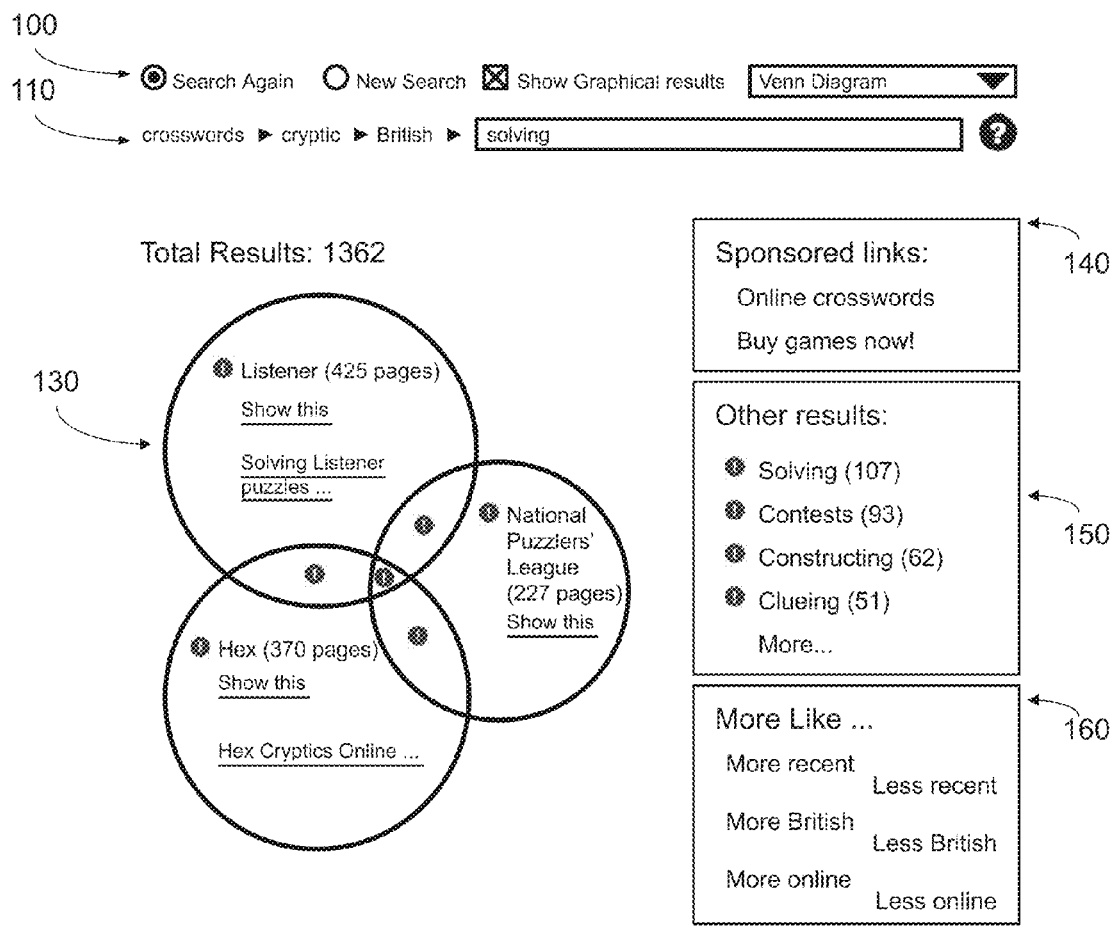
FIG. 1 is an example of search results using a Venn diagram viewer.
Figure 2:
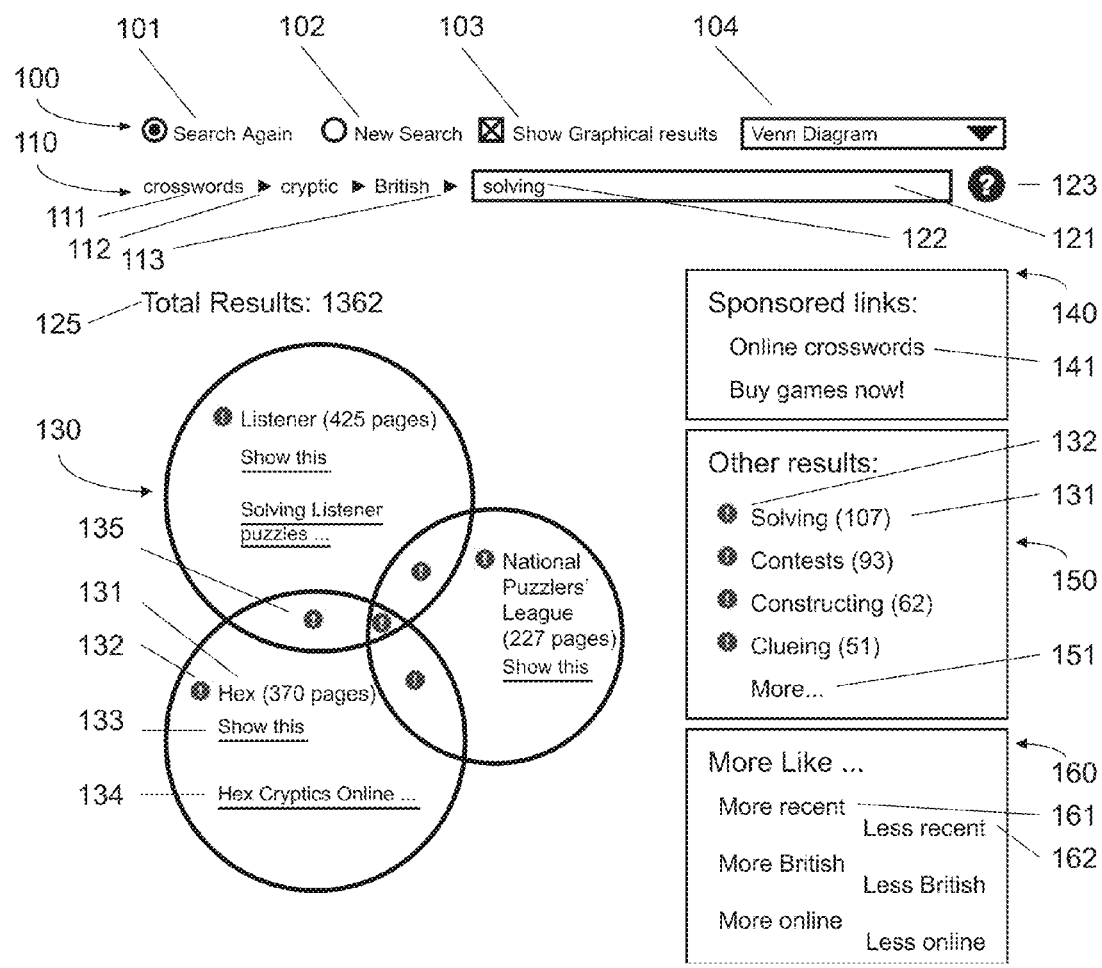
FIG. 2 is an example of search results using a Venn diagram viewer showing additional details.

Although the following description contains many specifics for the purposes of illustration, anyone skilled in the art will appreciate that many variations and/or alterations to said details are within the scope of the present invention. Similarly, although many of the features of the present invention are described in terms of each other, or in conjunction with each other, anyone skilled in the art will appreciate that many of these features can be provided independently of other features. Accordingly, this description of the invention and the preferred embodiment is set forth without any loss of generality to, and without imposing limitations upon, the invention.

This description makes reference to both prior art and proposed future art which, by itself, is not intended to be covered by this patent. However, anyone skilled in the art will appreciate the novel and useful ways in which said art is utilized in the present invention. Proposed future art fits into two categories: that which does not exist today, but is obvious given existing prior art; and that which does not exist today, may or may not be obvious given prior art, but, in the context of the present invention, may be utilized when and if it exists.

Throughout this description, a number of standard terms are used, but it useful for clarity to define them herein.

An application is some computer software some code running on a particular machine, either a program which has been manually or automatically launched, a service started by the operating system, or a component started by another application.

A server application is an application which is running on a logical server, usually in a data center, usually, but not always, accessed indirectly by users. Unless otherwise stated, everything that applies to an application also applies to a server application.

A logical server, usually called just a server, is a plurality of server applications running together.

A server machine is a physical computer system which functions as a plurality of logical servers. In a large server configuration, each server machine functions as only one logical server, but in smaller configurations, many logical servers will be rolled up onto one server machine.

A server configuration is a configuration of a set of servers that make up a data service and/or data center. Usually, a server configuration is represented by a server configuration map, showing both server machines and which logical servers are on each server machine. In a server configuration, there are usually banks of identically-configured server machines which all serve as the same logical server.

A data value is a piece of data for use by a computer or computer user, including, but not limited to, text, formatted text, an image, a sound, or a movie.

A data item consists of a plurality of data values. In the preferred embodiment, data items are files on the internet, including, but not limited to, hypertext (HTML) documents, Acrobat (PDF) files, Application-specific files (e.g., a Word or Excel document), image files, sound files, and movie files.

A data set comprises a plurality of data items.

Meta-information about a data item is information which is associated with the data item but is not part of the data item.

Meta information may be included within a data item (e.g., a META tag in an HTML document), specified alongside a data item (e.g., attribute information in a file system), or retrieved from an external data source (e.g., CD name and track information for a music CD, obtained from a service which provides such information, given a CD identifier).

A local file system is a data set existing on a single computer system, for use by that computer, which may optionally be shared out from that computer system for remote use by other connected computers.

An indexable data set comprises a data set, each item of which can contain a plurality of one-way or two-way links to other items. An item may have zero links. In the preferred embodiment, the indexable data set is the data set comprising the searchable portion of the Internet.

Throughout this description, terms related to searching on the internet are used. However, anyone skilled in the art will appreciate that searching files and documents on a local file system can be handled in the same manner as searching pages and files on internet sites, so this invention applies equally well to such local file system searching. Similarly, anyone skilled in the art will appreciate that a combined search across both a local file system and internet sites can be handled in the same manner.

There are multiple prior art techniques for creating an index of a data set, known also as a search engine index. Such indexing techniques are used in databases, custom applications and, notably, internet search engines. The present invention builds on such prior art techniques in a number of novel ways, in order to provide significant benefits for users.

There are multiple prior art techniques for presenting the results of a search engine, known also as a search engine user interface. Such presentation techniques are used in prior art internet search engines as well as operating systems and other software. The present invention builds on such prior art techniques in a number of novel ways, in order to provide significant benefits for users.

In the preferred embodiment, the improved search engine index is integrated with the improved search engine user interface to provide the best overall benefits for users. However, anyone skilled in the art could see that alternate embodiments could instead use any search engine index capable of indexing and returning a data set resulting from a search or, alternatively, could use any user interface capable of displaying a list of search results.

Although many of the features of the present invention are described individually, the preferred embodiment incorporates many of them together and it will be obvious to anyone skilled in the art that any number of combinations of them are possible.

The Structure of the Search Engine

Figure 3:
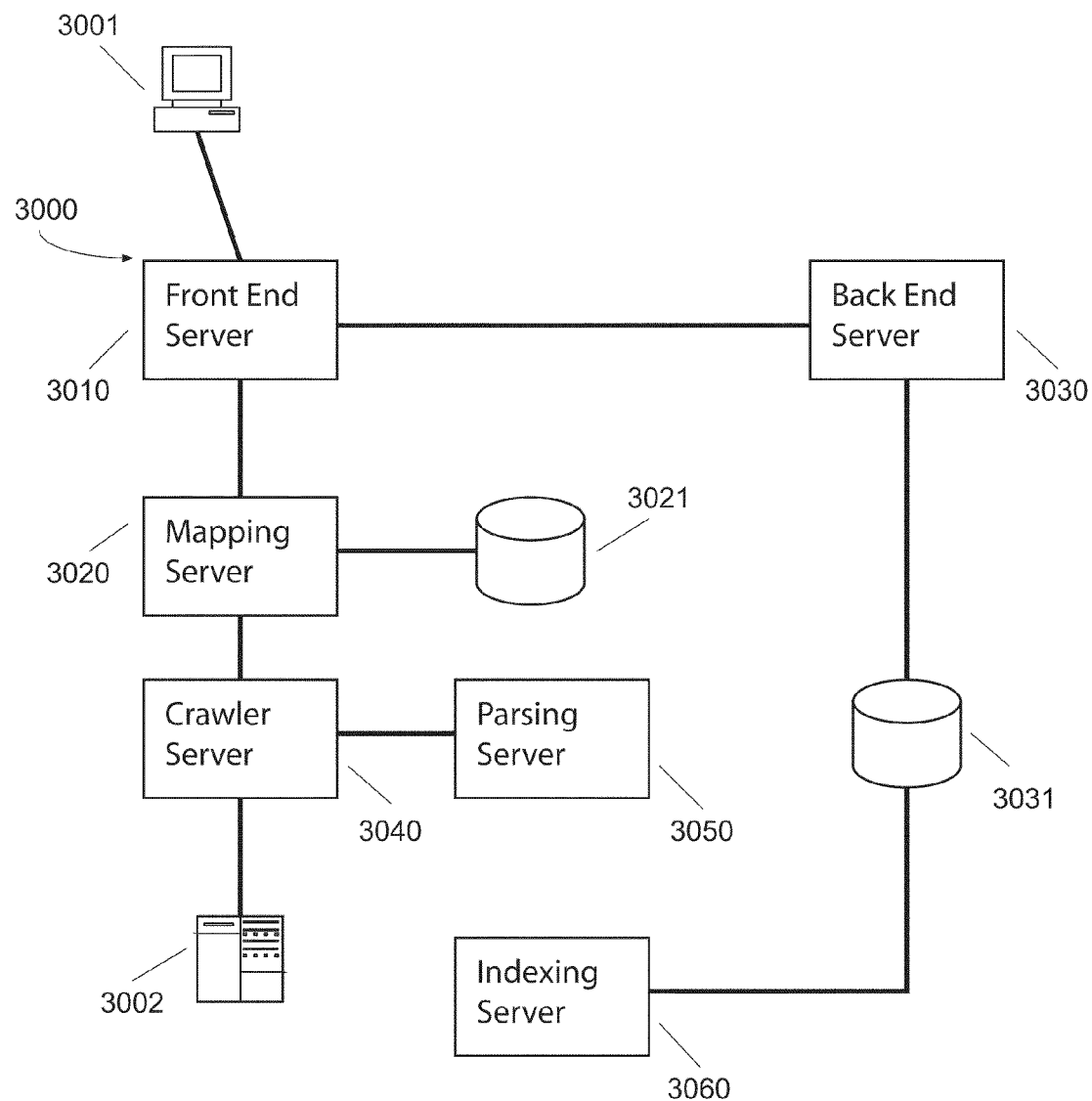
FIG. 3 shows a block diagram of a portion an internet search engine which responds to queries that embodies some features of the invention.

FIG. 3 shows a block diagram of a portion of the preferred embodiment of an improved search engine embodying some features of the invention.

When indexing pages, the search engine crawler server 3040 accesses a server 3002 (usually an external server, and usually an external web server) which is to be indexed, in order to retrieve and index the data (usually web pages) on it. The crawler server uses the parsing server 3050 to parse the data. The parsing server returns a list of categories of information which are represented in the data (for category searching), as well as a list of all textual tokens in the data (for keyword searching). An example of such a parsing server is a natural language parser. Note that such natural language processing to extract a set of key phrases is prior art (for example, Microsoft Word contains such an AutoSummarize command which does this). The crawler server sends the list of textual tokens to the mapping server 3020, which transforms them using the mapping database 3021 (for example, see the description of the exemplary mapping process 2200 below). The crawler server then sends the list of categories, the transformed list of textual tokens, and the location information about the data being indexed to the indexing server 3060 which writes it to the search database 3031 for use by the back end server in searches.

When serving requests, a user uses a device 3001 (usually a computer) to access the search engine 3000. Within the search engine, the request is received by a front end server 3010. The front end server preprocesses the request using the mapping server 3020, which transforms the mapping request using the mapping database 3021 to produce a set of revised search terms and/or search categories. The front end server then sends the request to the back end server 3030. The back end server uses the search database 3031 to process the search request, returning the results to the front end server, along with the mapping information used for the search, which then returns them to the user's computer, possibly using the mapping information to alter the way in which the results are shown to the user.

Figure 4:
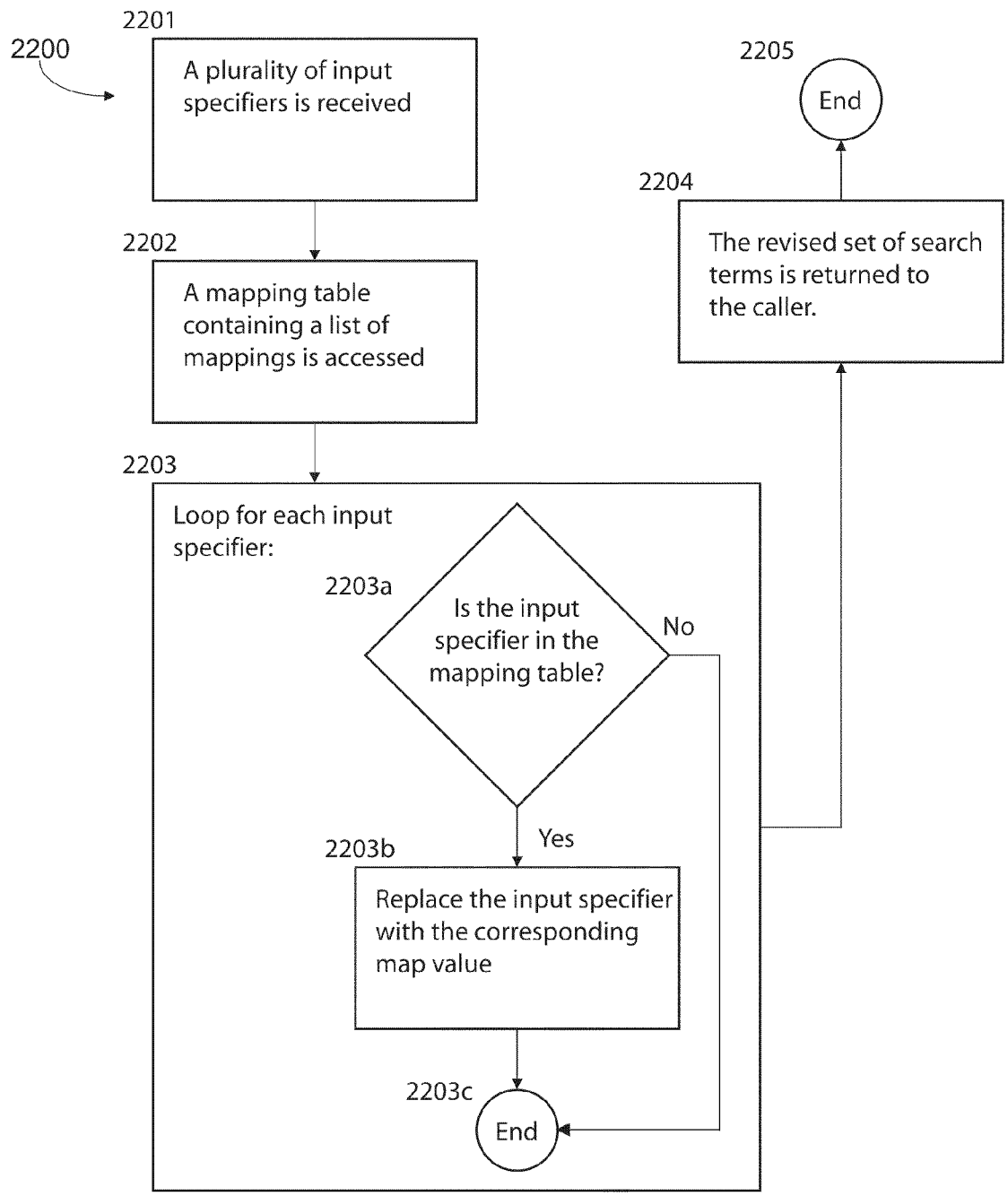
FIG. 4 is a logic flow diagram illustrating an exemplary process for mapping search terms.

FIG. 4 illustrates an exemplary process 2200 for mapping search terms. In step 2201, a plurality of input specifiers is received. In step 2202, a mapping table is accessed for the purpose of mapping the input specifiers. In step 2203, two sub-steps are repeated for each of the input specifiers. In step 2203a, the input specifier is looked up in the mapping table to see if it is there. If it is, in step 2203b, the input specifier is replaces with the corresponding map values from the table. The map values can contain a plurality of replacement search terms, a plurality of categories, or both. In either case, the inner loop ends with step 2203c. Next, in step 2204, the revised set of search terms is returned to the caller, and the process ends in step 2205.

FIG. 34 shows an exemplary embodiment of the mapping database 3021. Database 1000 consists of three columns of data: search term 1010, consisting of search term values 1011; mapped term 1020, consisting of mapped term values; and map type 1030, consisting of map type values 1031. Within the database, a set of a search term value, a mapped term value, and a map type value make up a row 1040. When a term is looked up, it is matched against the search term values and the corresponding mapped term value and map type value are returned.

Improved Search Request Processing

Figure 39:
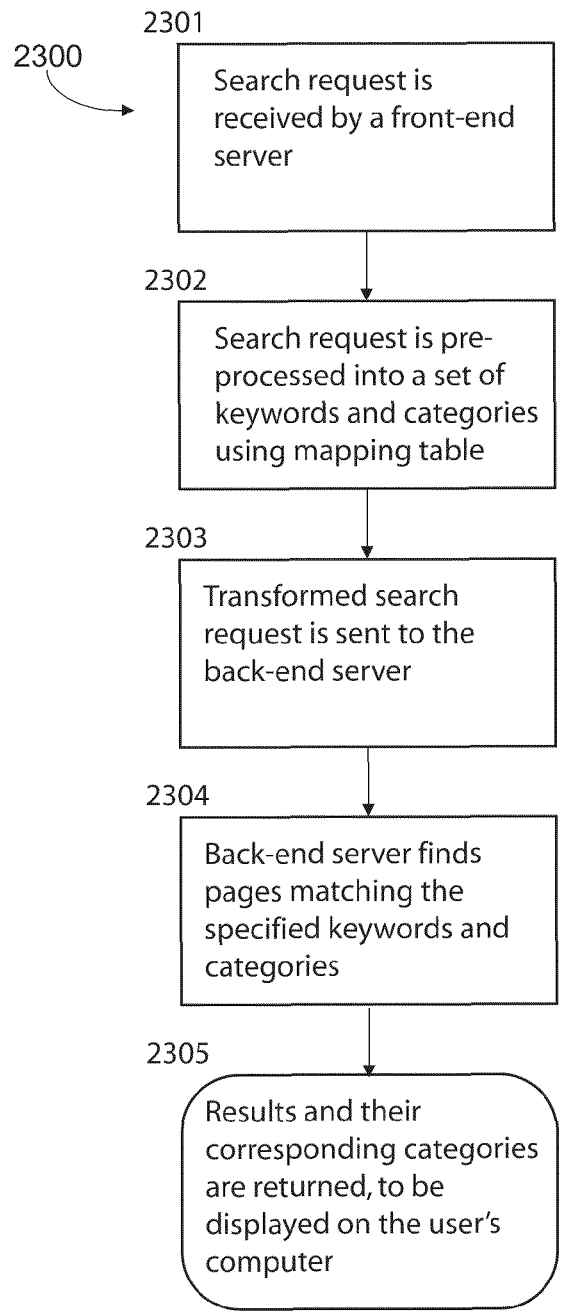
FIG. 39 is a logic flow diagram illustrating an exemplary process for responding to a search request.

FIG. 39 illustrates an exemplary process 2300 for responding to a search request. In step 2301, the system receives a search request. In step 2302, the search request is preprocessed to turn it into a set of search keywords and search categories (for example, using exemplary process 2200). In step 2303, the request is sent to the back-end server which handles the actual search request, using the keywords and search categories provided by the front-end server. In step 2304, the back-end server finds the appropriate pages matching the keywords and categories. In step 2305, the resulting pages, along with the corresponding categories, are returned, so they may be displayed to the user.

Although this process describes using a mapping table, a heuristic, such as a dictionary or thesaurus lookup, or natural language processing can also be used.

This embodiment therefore provides an "expanded search" capability, which effectively automatically expands a search result data set to include data from typo corrections and phrase alterations. Any categories used in the page matching are passed on to the user interface for possible display to the user.

For example, a user searching for "Brittany Speers" would automatically get matches for both "Britney Spears" (the correct spelling) and "Brittany Speers" (incorrect, but what the user typed), as well as other variant spellings such as "Britany Spears" which are found in the mapping database.

In addition, phrase alternation includes both stemming (using alternate forms of a word) and equivalency (using synonyms of a word). For example: a user searching for "gasoline tax" would also get matches for "gas tax", "gas taxes", and "gasoline taxes" because of stemming and might get "petrol tax" or "gasoline VAT" because of equivalency (in England, for this example).

Ranking within a result set occurs as described elsewhere, but a heuristic based on the categorization is also used, including but not limited to giving a higher rank to pages which match multiple categories, and giving a higher rank to pages with phrases that more closely match the searched-for phrase.

Possible Expanded Search options include: Off, On [Rank Corrections Higher], Rank Corrections Equally, Rank Corrections Lower.

Improved Search Engine Indexing

Figure 40:
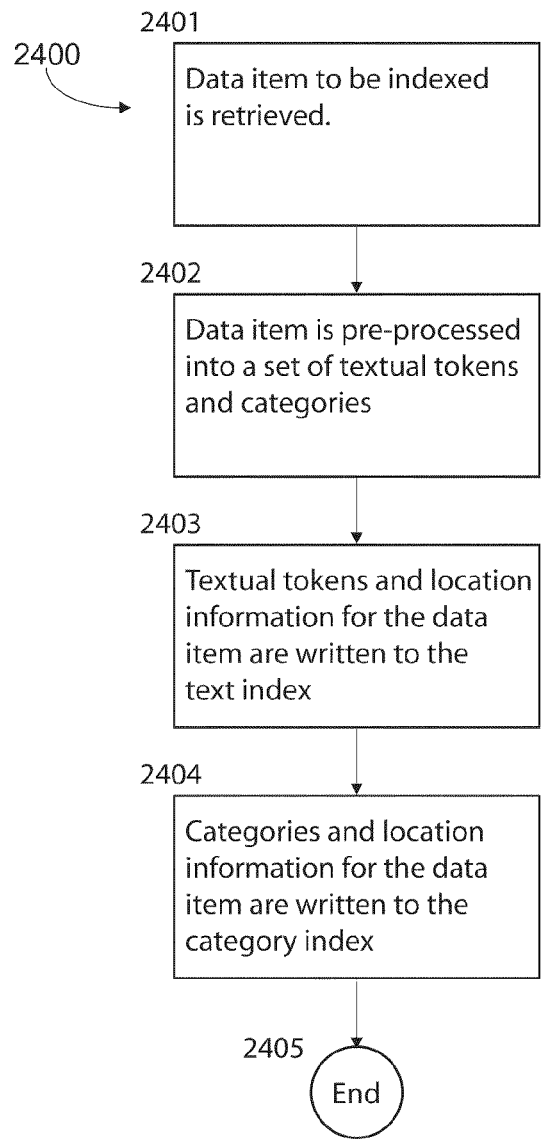
FIG. 40 is a logic flow diagram illustrating an exemplary process for adding a data item to a search engine index.

FIG. 40 illustrates an exemplary process 2400 for adding a data item to the search engine index. In step 2401, the system retrieves a data item to be indexed. In step 2402, the data item is preprocessed to turn it into a set of textual tokens and categories (for example, using exemplary process 2200). In step 2403, the textual tokens, along with the location information for the data item, are written to the text index. In step 2404, the categories, along with the location information for the data item, are written to the category index. These indexes will be used by the back-end server during search requests. The process terminates in 2405.

The result of this indexing is that, in addition to the keyword indexes used by prior art search engines, every data item is also indexed by synonymic terms and by categories.

This embodiment provides an "expanded search" capability which automatically incorporates synonyms in the search engine index. For example, all of the search terms "Brittany Speers," "Brittany Spears," "Britny Speers," and "Britney Spears" (the correct spelling) are treated as equivalent, both in terms of building the index and in terms of searching the index. Similarly, "Chanukah" and "Hanukkah" are synonyms, as are "Koran," "Quran", and "Qur'an."

All search terms in a synonymic set are essentially treated identically while the index is being built. Some algorithms may choose to use which synonym is used as one factor in page ranking, but this is not the preferred embodiment. All search terms in a synonymic set are also treated identically during searching of the index.

This embodiment also provides an "expanded search" capability which automatically searches for pages that match a concept rather than a set of keywords. The mapping server 3020 uses the same natural language parsing algorithm used on the parsing server 3050 to determine the meaning of the searched-for phrase then all other phrases which have the same meaning are then searched for, with pages ranking relatively well based on how close the phrase is to the user's phrase.

This embodiment uses an expandable mechanism to facilitate the conversion of keywords into concepts, allowing us to expand this quickly, but also to allow third parties to specify concepts in specific areas that we may not even be aware of. The expandable mechanism consists of the ability to supply data sets of information (probably in XML), the ability to supply a web service which performs the conversion, as well as the ability to provide a heuristic function to be evaluated/executed.

The phrase can be separated into a plurality of conceptual parts and literal parts. For example, the search "house painter Minneapolis" might be transformed into the concept "house painter" and the literal "Minneapolis."

Page Categorization

The preferred embodiment of the present invention includes a mechanism by which pages are categorized into categories. Each page belongs to zero or more categories of pages. The categories which pages may belong to is not a pre-defined specific list, although some categories are pre-defined in the preferred embodiment. Some examples of categories, in no particular order, are: jobs, faq, news, blog, wiki, sales, marketing, dictionary, legal, about, education, lesson, kids, illustration, humor, cats, help, history, encyclopedia, games, sports, books, book content, etc. While these are examples of very general categories, much more specific categories will also exist. For example, Kansas Jayhawks, Kansas Jayhawks Basketball, Florist Jobs, etc.

In short, most pages are about a small plurality of topics, but prior art search engines make no attempt to determine that, instead relying almost exclusively on searched-for phrases.

Because prior art search engines have no concept of what pages are about, they have poor defenses against a number of search engine attacks, known as spamdexing, including googlebombing and link farms which are simply millions of links to other sites and designed to attract hits to generate ad or referral revenue (common targets are Amazon and Wikipedia). Similarly, because prior art search engines have no concept of what pages are about, they are unable to differentiate between pages about George Bush and pages which mention George Bush, or which simply have the words George and Bush on them.

Pages may be categorized in a number of ways, either automatically or manually.

Automatic Page Categorization

In the preferred embodiment, the contents of the page are examined using a heuristic algorithm which weights the title, contents, and meta-information of the page in order to determine what categories the page belongs to. For example, a page with lots of questions and answers about cat breeds might be placed in the cats and faq categories.

In the preferred embodiment, the contents of the page are also examined using a natural language processing algorithm which weights the title, contents, and meta-information of the page in order to determine what categories the page belongs to. For example, a page with lots of questions and answers about cat breeds might be placed in the cats and faq categories.

In the preferred embodiment, the contents of the page are also examined using a statistical algorithm which weights the relative frequency of words and phrases within the title, contents, and meta-information of the page relative to other pages. In addition, the algorithm can take into account the text of the pages (including keywords and formatting), the names of links and the contents of pages at the destination of a link, and synonyms of words present on the page.

In the preferred embodiment, the location and/or placement of the page is also examined using a heuristic algorithm. For example, all pages on the web site CareerBuilder.com would be categorized as jobs pages, or all pages on Amazon.com might be categorized as sales pages. A news article published on a certain date would be categorized as that date, even if the date itself did not appear in the article. In addition, the structure of the local web site is recognized and used by the heuristic algorithm. For example, an /employment/ or /careers/ section of a web site could be construed to be about jobs even if the site itself was not about jobs.

Manual Page Categorization

Manual categorization is done by means of so-called META tags, robots.txt files, site indexes, or similar techniques. For example, a META tag could provide a list of categories for a page. The system may optionally discount or disregard manual categorization information in favor of its own heuristics, as a means to prevent "spam" pages.

Duplicate pages (as is common, for example, with news articles) are categorized together and are categorized as duplicate.

Operator Assistance for Page Categorization

Another embodiment of the present invention provides a mechanism by which pages can be categorized manually, with the assistance of an outside source, such as a human operator.

The mechanism uses a fitness function which determines how the quality of search results being given to users. In the preferred embodiment, the fitness function is a heuristic that examines the homogeneity of a set of search results and assigns a lower (better) fitness value to those search results that are more homogenous. The fitness function, particularly in an enterprise search server, can be customized or modified.

Every search request received by the system is processed using the fitness function and those with a higher (poorer) fitness value are saved in a database. Identical search requests are automatically combined and similar search requests (based on partial keyword matches, word stemming and other similar techniques discussed earlier) are grouped together. The overall fitness of a search request is defined as a product of the quantity of queries associated with the result set and the fitness value. The higher this product, the poorer the search request.

At any given time, the worst fitting search result sets can be viewed, using a standard database query. An external application uses this database query to "bubble up" the worst fitting search result sets so that a human operator can examine the result set and add additional information to the database to improve the quality of future results. The additional information can include additional categorization information, additional categorization information for specific pages, modification to heuristic functions, or other information.

Initiating a Search in the Improved Search System

FIG. 24 shows the preferred embodiment of an initial search user interface showing search modes which have been customized for a user. The user interface consists of a search box 300, a search button 301, which initiates the search when the user clicks on it, and a plurality of search tabs 302, which specify a search mode or requested categorization for the search.

Figure 26A:
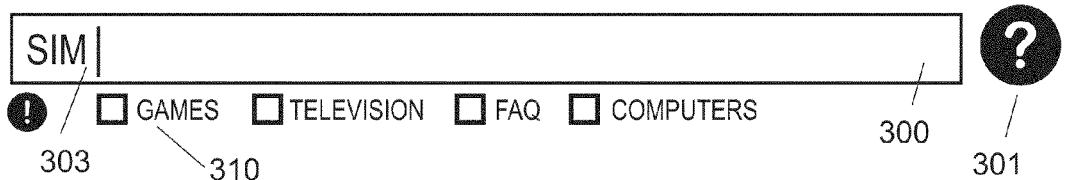
FIGS. 26A, 26B, 26C, 26D, and 26E are examples of predictive options and categorization while a search request is being typed, illustrating categories becoming highly relevant as more text is typed, and personally-relevant categories being added in when appropriate.
Figure 26B:
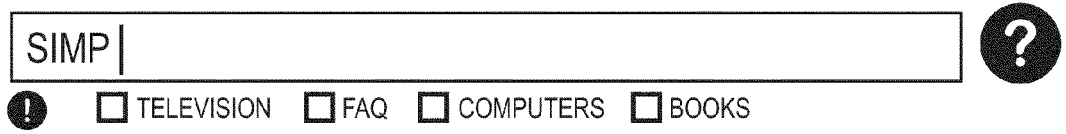
Figure 26C:
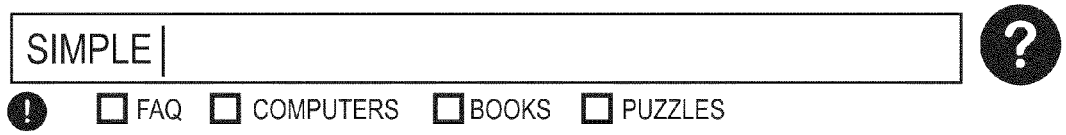
Figure 26D:
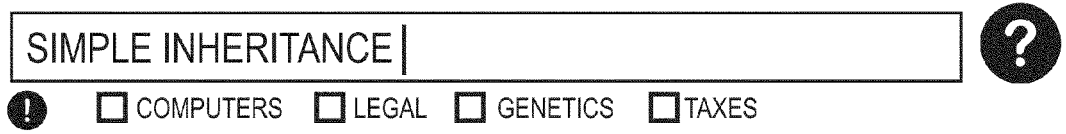
Figure 26E:

FIG. 26A shows the preferred embodiment of a user interface which presents context-specific search options to a user as they are typing in a search query.

As the user is typing, what they are typing is examined to determine if there are "well-known" categories that are applicable. In this case, "well-known" means well known to the user, either because it is a generally well-known categorization (possibly, but not necessarily, provided to all users), because it is part of the user's personalization information, or because it is part of the current session state.

The partial search term 303 typed into the search box 300 is sent to the server, where it is looked up and a set of relevant categories is returned. These categories are shown to the user as user-specifiable options 310. As the user types, the user-specifiable options change to reflect the text that has been typed, as shown in FIGS. 26B, 26C, 26D, and 26E.

The preferred embodiment for supplying the relevant categories is a predictive technique. As the user types, the words they are typing are examined to see if the actual words the user is typing can be predicted, based on similarly "well-known" information about the user. The use is then provided with a list of categorized searches that are applicable, which can then be quickly activated, for example, with a single click, without initiating the original search. For example, if the user has typed "Britney Spears", they may be shown categorized searches for "News," "Music," and "Fan sites." But, if the user has typed just "Brit", they may be shown three main categories, "British", "Britain", and "Britney Spears", each of which have their own, separately categorized search buttons supplied. Multiple categories may also be shown in the case of words or phrases which have more than one meaning, or which are used in different contexts (e.g., "amazon" is a bookstore, a river, and a mythological reference, among other things). A word or phrase may have additional meanings or contextual definitions which are known but not highlighted, as the system can choose to highlight only a subset of such meanings or definitions, depending on user preferences, context, or other information.

An alternate embodiment is a non-predictive technique. Similar to above, except only complete or apparently complete words are examined. They system may do "look ahead" in order to do advance processing of search terms and provide the user with a more responsive user interface.

Another alternate embodiment is on-the-fly typo correction. Similar to above, except alternatives for typos or apparent typos are automatically supplied.

Another alternate embodiment is to supply context-specific search options rather than categories. For example, an option to provide a Music or Image search might be provided when a search for "Britney Spears" was initiated.

Figure 30A:
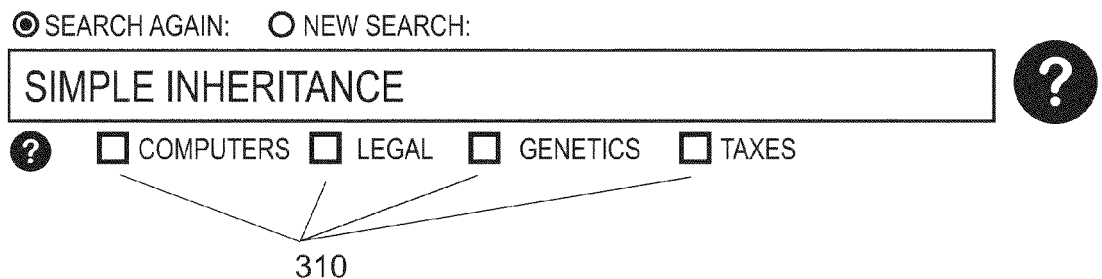
FIG. 30A is an example of user selection of predictive options for a search request.

FIG. 30A shows an example of the search interface where two of the four user-specifiable options 310 have been selected by the users. FIG. 30B shows an example of search results returned as a result of the search in FIG. 30A, where the results have been altered based upon the user-specifiable options, such that these categories are given more prominence in the results even if other results might have otherwise been highlighted (for example, because they were larger). To indicate this, the preferred embodiment of the user interface displays an indicator 320 along with the search results.

Improved Display of Search Results

FIG. 1 is an example of search results using a Venn diagram viewer, which illustrates many of the features of the improved search system. The user interface shown contains search options 100, a search form 110, along with total results 125, search results 130, which is accompanied by a plurality of additions, such as sponsored links 140, other results 150, or more like options 160.

In the search options, the user is able to choose whether they are continuing the current search or initiating a new search, with controls such as control 101 and control 102, plus they are able to specify how results are to be shown to them, with controls such as control 103 and control 104.

In the search form, the user is shown the state of the current search with indicators 111, 112, and 113, which show the search path used to reach the current search state. Each of these indicators are controls. An indicator 111 may be clicked on to return to the corresponding search state, while an indicator 112 or 113 may be clicked on to switch to an alternate search state at some point in the search path. Alternatively, the user may type a search string 122 into search box 121. The action button 123 may then be clicked to initiate a new search, or the user may simply press the Enter key or equivalent.

Whenever a search is completed, the results are displayed. The total results 125 are shown in addition to a breakdown of results, according to the method specified by controls 103, which allows a selection of a textual or graphical viewer, and 104, which allows a selection of a specific viewer. In this example, search results 130 uses a Venn Diagram viewer. Each search subset shown in the viewer has several components, including a name 131, which can also include information about the value of the search (in the example, the number of pages found), a show this icon 132 and a show this button 133, both of which show a drill-down set of search results. In some cases, the search subsets show some individual results 134.

In some viewers, including the Venn Diagram viewer, additional icons 135 are available which may be used to drill down into other subsets.

The search results are accompanied by a plurality of additions, represented in this figure by sponsored links 140, other results 150, or more like options 160.

The sponsored links show a plurality of paid links 141 (advertisements) which are relevant to the user, according to search keywords (as in prior art), or search categories which have been found. See below for more description of this.

The other results section allows one or more subsets deemed to be less relevant to be separated off in order to simplify the presentation. The other results contain the same search results name 131 and show this icon 132 as in the viewer. When there are more results than can be shown, a more other results button 151 is provided to bring up a full list of other results. See below for description on how the user may dynamically change which results are used in the viewer.

Figure 32:
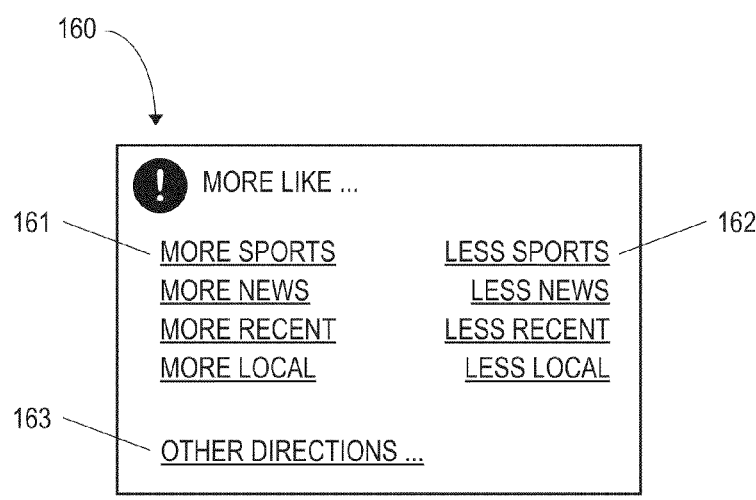
FIG. 32 is an example of search directions.

The more like options, shown in more detail in FIG. 32, provide a number of options which allow the user to direct the search. This consists of a number of more options 161 and less options 162, which are a mix of generic options (such as More/Less recent) and search-specific options (such as More/Less online in the example). A link 163 (as shown in FIG. 32 to additional options can also be provided.

The more like options apply a prior art concept to search in a novel way. For example, Photoshop has a feature to adjust a picture with options like "More Blue," "More Red," "More Contrast," and "Darker." The more like options for search can be calculated on the fly based on both the query and the result set. The differentiating options are essentially the distinguishing characteristics or keywords of the query in the n-dimensional category space in which it sits, with the most prominent differentiating options coming from the categories in which it is most closely aligned with. Optionally, Options could also come from a database based merely on the query string. Optionally, Options could also come from concepts related to the found pages. For example, if many news articles are found, the "More Recent"/"Less Recent" directions might be provided to the user.

Multiple prior art search engines have a similarly named feature called a "More like this" option which looks superficially similar but is quite different. The "More like this" option finds pages which are "related to" or "similar to" a single specific page, using a heuristic that matches the content of the page.

Another option of the more like option is a "More from sites like this" option, which shows more pages which are from sites which are like the site a given page is from. For example, if a page from cnn.com is shown, the "More from sites like this" feature would show pages from msnbc.com, foxnews.com, etc.

Improved User Interface

The preferred embodiment of the present invention uses a user interface to present search results to users and allows them to interact with those results.

The user interface presents a plurality of sets of search results, displayed in parallel or simultaneously, which are, in essence, subsets of the larger data set that the user searched for. Depending on the actual data found, these data sets might be partitions of the original data, overlapping subsets, or some overall subset of the larger data set. The system works as if the user actually has received the entire data set, even though they are only shown a small portion of it.

The data sets may be calculated, as discussed elsewhere, from the pages that have been found, including information about the sizes of the various potential data sets, but they may also be calculated by other means, including, but not limited to, context of the search (e.g., "Today's News"), or context of the users preferences (e.g., "Redmond, Wash. results").

Each data set contains some or all of the following:

A set of search results, ranked within the context of the data set, including some or all of the following: A method or mechanism for modifying the set of search data within a data set, including, but not limited to: "expando" buttons which allow for a tree of information to be expanded in-place in order to show related pages, An index or cross-reference list of other pages, A control to show example or sample information; A set of ads relevant to the particular data set; A set of controls, mechanisms, buttons, links or other UI for the purpose of narrowing down the search within the data set; an optional control or mechanism to allow the user to turn off any search customization, including, but not limited, to personalization options, context options, and enterprise options.

An optional control or mechanism to allow the user to turn off any special search interfaces in order to get a simple integrated list, as in other search engines.

A method or mechanism for displaying and modifying the sets of data shown, including, but not limited to: a tree view of related areas, a collapsible/expandable tree view of related areas, a table of contents, an alphabetical listing of related areas, an index or cross-reference list, a set of categories, example or sample information, Venn diagrams, 2-dimensional or multi-dimensional graphs and charts, histogram, 2-dimensional histogram, pivotable graphs and charts. The system may choose a default user interface mechanism or may dynamically select between different user interface mechanisms based on the number of results returned.

In the preferred embodiment, each data item shown in a result set provides a link which implements at least the following two mechanisms: a mechanism to navigate to the "found" item, and a mechanism to record as "context information" the fact that the user has activated the specified object and other information, such as the time of the click. In the preferred embodiment, this is either a cookie or local machine "user data" (e.g., as implemented in Internet Explorer), depending on the browser and browser settings in use.

In the preferred embodiment, these two mechanisms are integrated seamlessly such that the information is recorded locally, with no redirection through a tracking server. However, anyone skilled in the art will see that an alternate mechanism whereby a redirect URL can be used so that the information need not be tracked locally.

In the preferred embodiment, when the user initiates a search, the user interface sends to the search engine all available context information about the user and the search, including the navigation history information which has been recorded as described above, if available.

In an alternate embodiment, a mechanism could be provided for saving this context information permanently on a server, such that the context information would automatically be available to be used on behalf of the user whenever the server was aware of the user, such as when the user is signed in. In the preferred embodiment, this information is generated locally and then uploaded at the next opportunity, for example, when the user next returns to the search page. Other mechanisms for uploading this information could be used, including, but not limited to, a post on exit, post from a toolbar thread, or the use of a separate helper application.

In an alternate embodiment, a mechanism could be provided to maintain this context information permanently on the local machine, in a cookie, browser user data, a local database or file, or other storage mechanism.

A unique property of the present invention is the that users using the system feel like they are viewing a series of results sets as successive approximation, with each results set better than the one before, and with all the result sets tailored uniquely to them. This allows them to feel as if the web is being partitioned for their benefit, or that a "divide and conquer" system is helping them find what they want. Graphical means of showing the sets of data are particularly useful in achieving this effect because the dynamic features of the UI allows users to quickly pursue successive refinement of a query.

The user can specify a particular view of data, switch between different views of the same data, or the system can select between different views of data according to the data itself.

A mechanism for determining which data sets to show and of the shown data sets, which data sets to highlight, such mechanism consisting of a heuristic which matches the potential data sets for a specified search, in a given context, against globally available information, contextual information, and information about the user's interests and preferences.

An optional mechanism allowing the user to move backward and forward along a stream of subsequent searches.

A plurality of auxiliary data items, displayed simultaneously, such as related searches, historical searches, etc.

Optionally manual modification or customization of the page to show other personal "home page" information provided by a number of prior art interfaces, including, but not limited to calendar information, news information, favorite web site information, stock information, the current day's comics.

In order to help make the elements of the improved interface clear, the figures show several exemplary viewers which provide a method and mechanism for presenting and manipulating search results.

Figure 5:
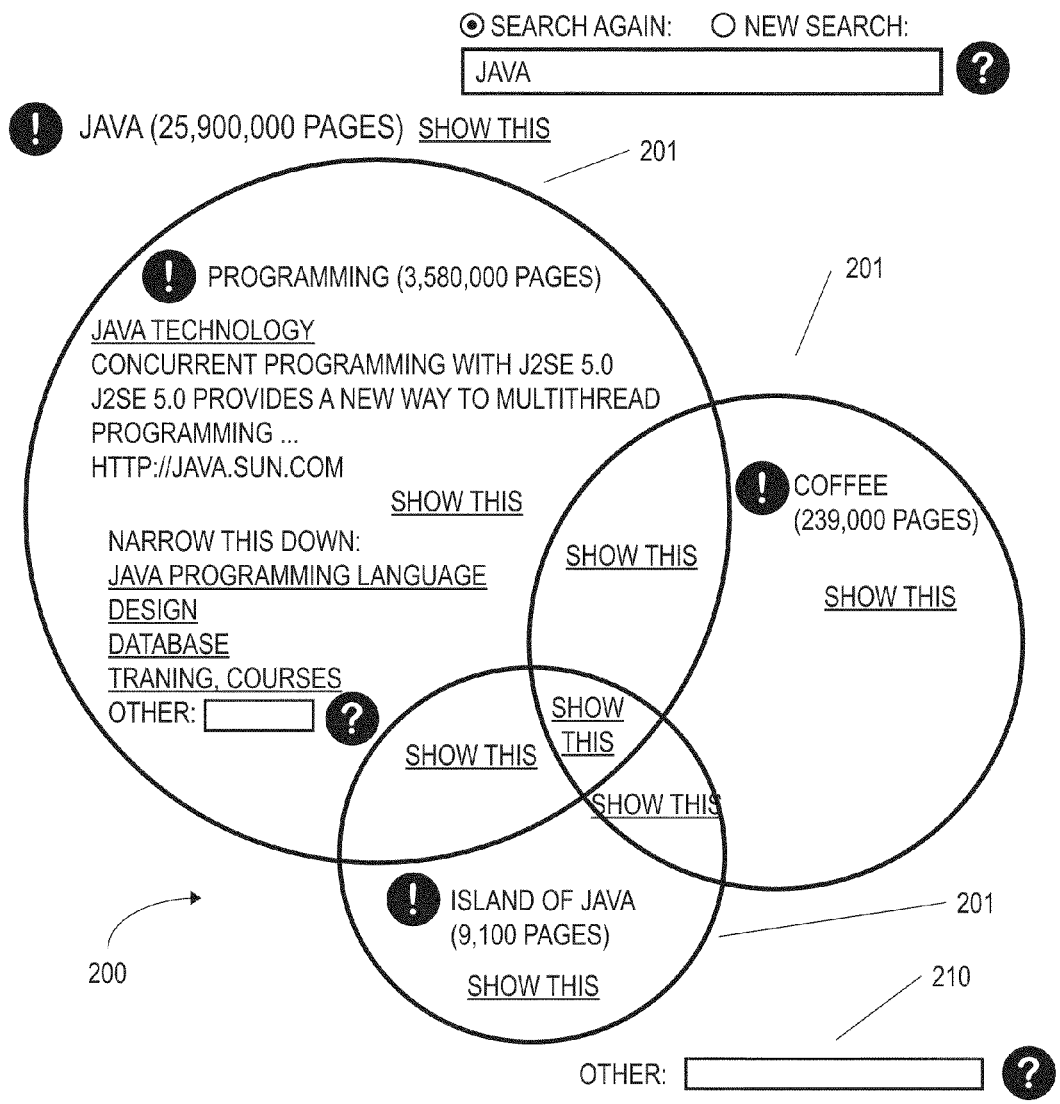
FIG. 5 is an example of search results using a Venn diagram viewer illustrating the capability of visually reflecting the relative weighting of the subsets.

FIG. 5 shows a Venn diagram viewer 200. This viewer is also shown in FIGS. 1, 2, 6, 7, 8, 9, 10, 11, 12, 13, 14, 15, 16, 17, 22, and 23. In FIG. 5, the viewer shows three subsets 201 which contain some or all the features described above. Note that the three subsets are of different sizes, reflecting the capability of the viewer to reflect the relative weighting of the subsets in a visual manner. Where the Venn diagram shows intersections, an intersection set 202 is shown, which contains some or all of the features described above. In addition, the viewer shows search options 210, which allows the user to manually specify an alternate subset for subsequent searching.

Figure 6:
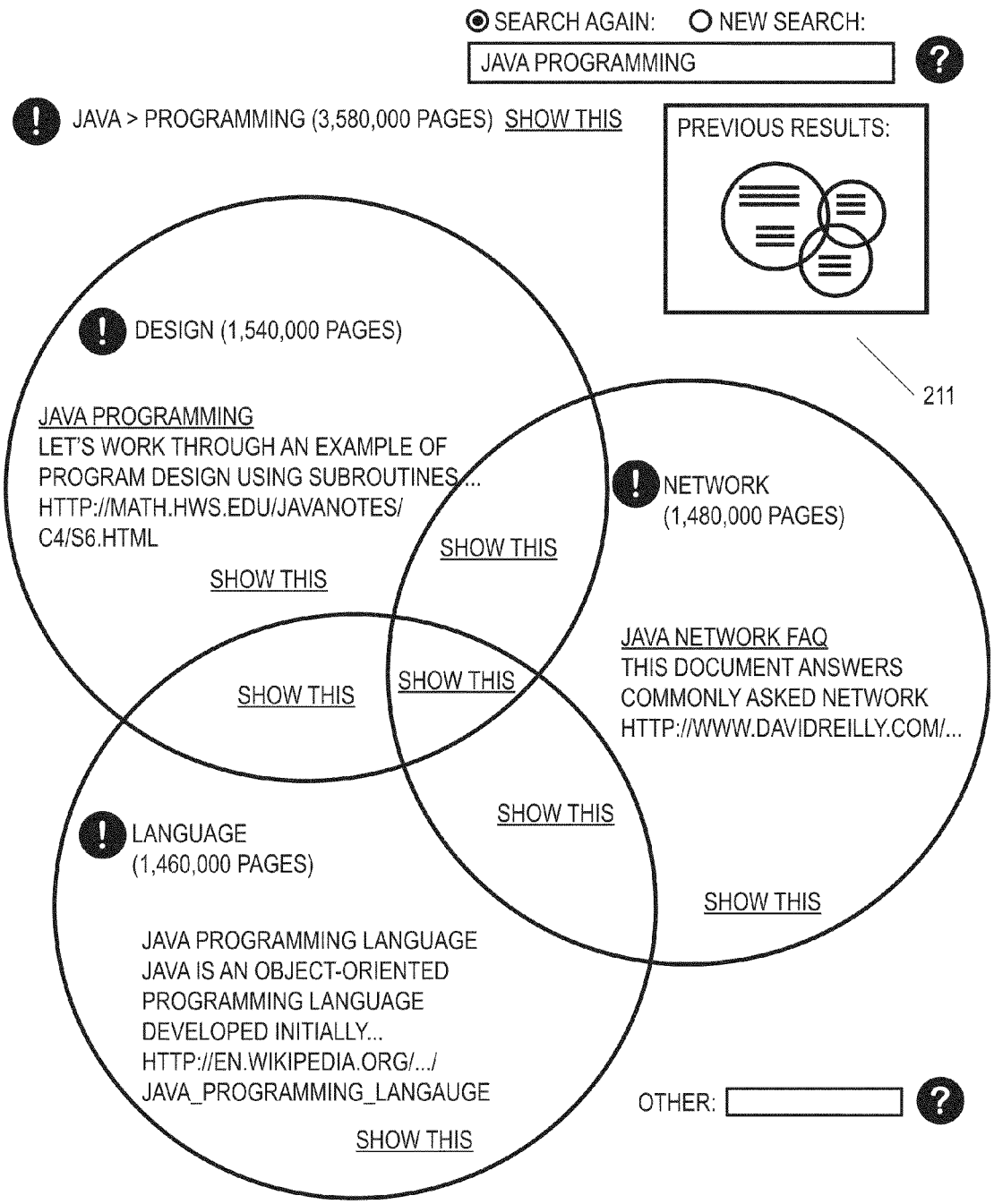
FIG. 6 is an example of search results using a Venn diagram viewer illustrating a thumbnail view of previous results.

FIG. 6 shows a similar viewer to FIG. 5, but adds a thumbnail view 211 of previous results. An alternate embodiment could show multiple thumbnails for multiple sets of previous results.

Figure 7:
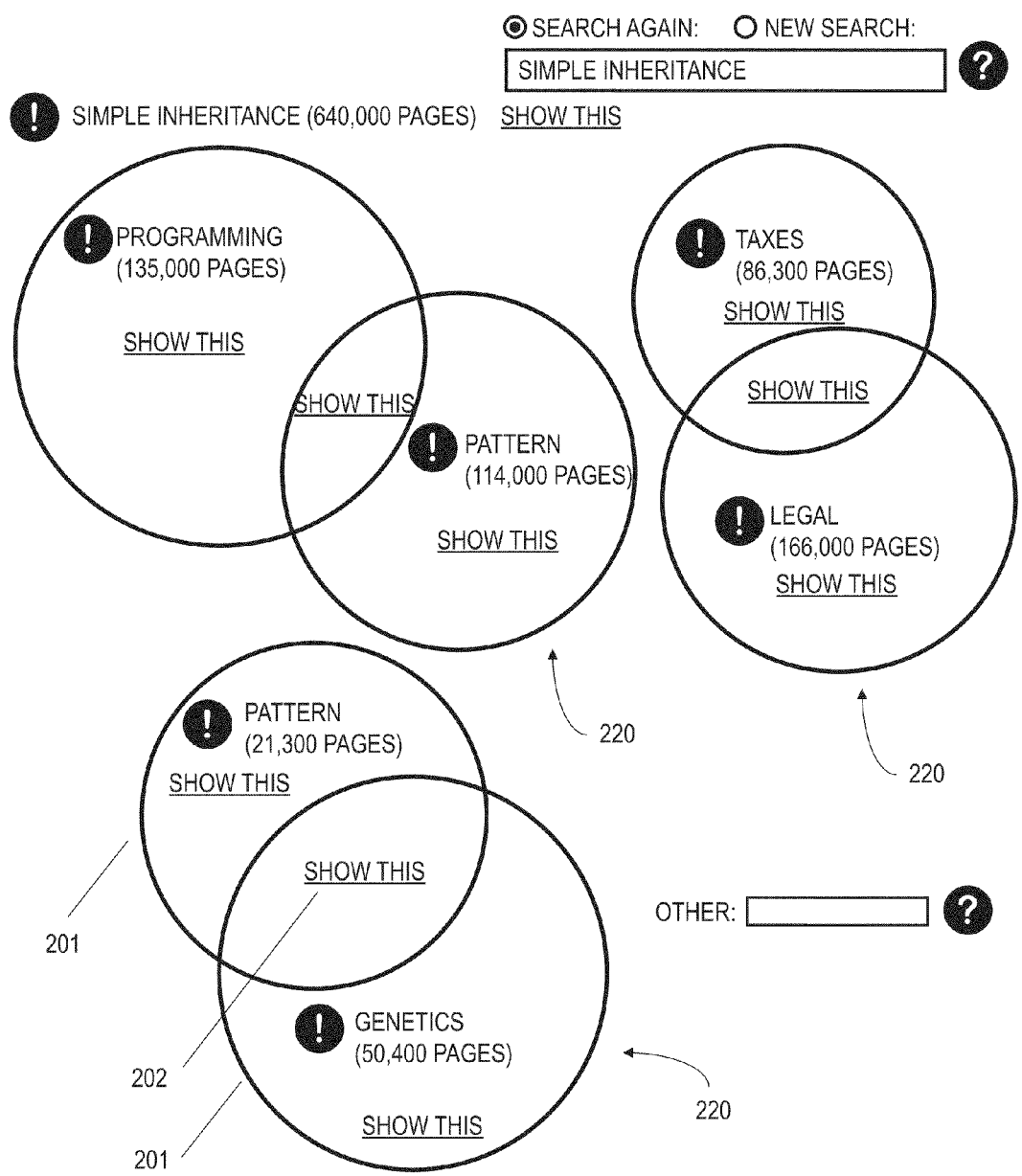
FIG. 7 is an example of search results using a Venn diagram viewer illustrating more complex search results with independent sections and differentiation between different subsets with similar names.

FIG. 7 illustrates how more complex search results can be shown in the Venn diagram viewer. In the figure, there are three subset groupings 220, each of which contains a plurality of subsets 201 (not all labeled in the figure) and intersection sets 202. Such subset groupings are determined by the interrelationships of the search subsets being displayed.

Figure 8:
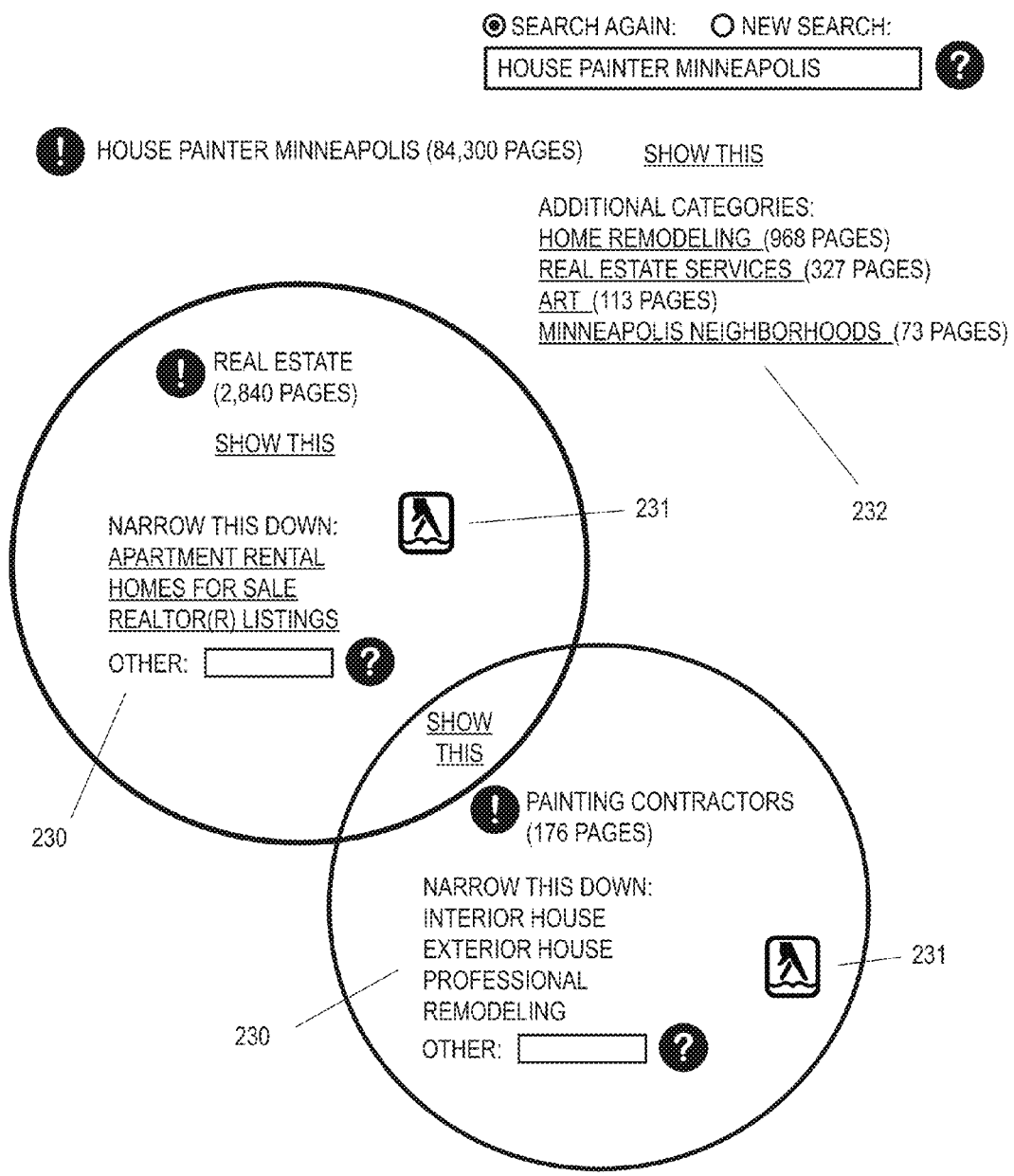
FIG. 8 is an example of search results using a Venn diagram viewer illustrating extra categorization of the subsets, in-context advertising links, plus additional listings.

FIG. 8 illustrates extra categorization of subsets, via additional subset links 230, plus in-context advertising links 231, plus additional non-expanded subsets 232.

Figure 22:
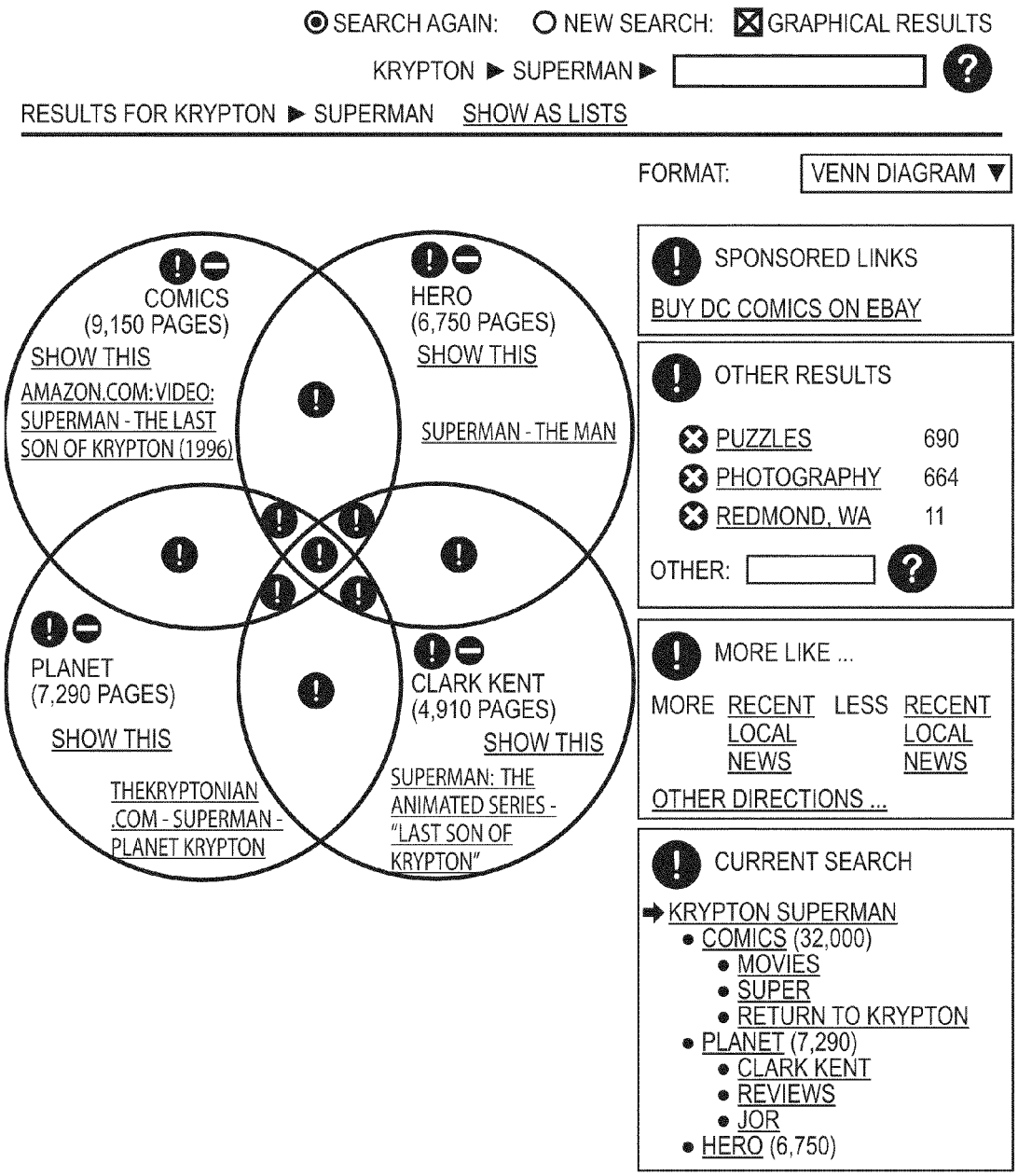
FIG. 22 is an example of search results using a Venn diagram viewer illustrating a set of complex relationships in a search result set.
Figure 25:
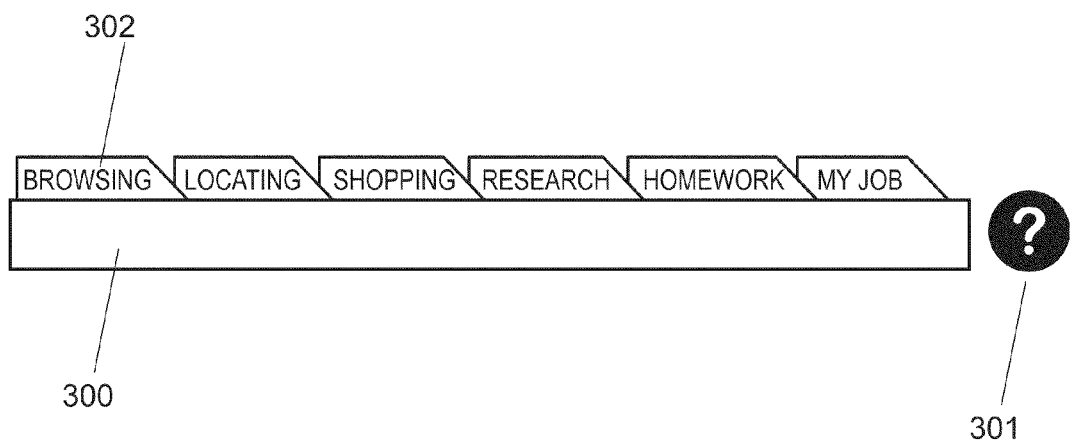
FIG. 25 is an example of initial search UI showing search modes which have been customized for a users.

FIG. 22 illustrates another complex set of subsets, showing how the Venn diagram is useful for revealing complex relationships in a search result set.

Figure 12:
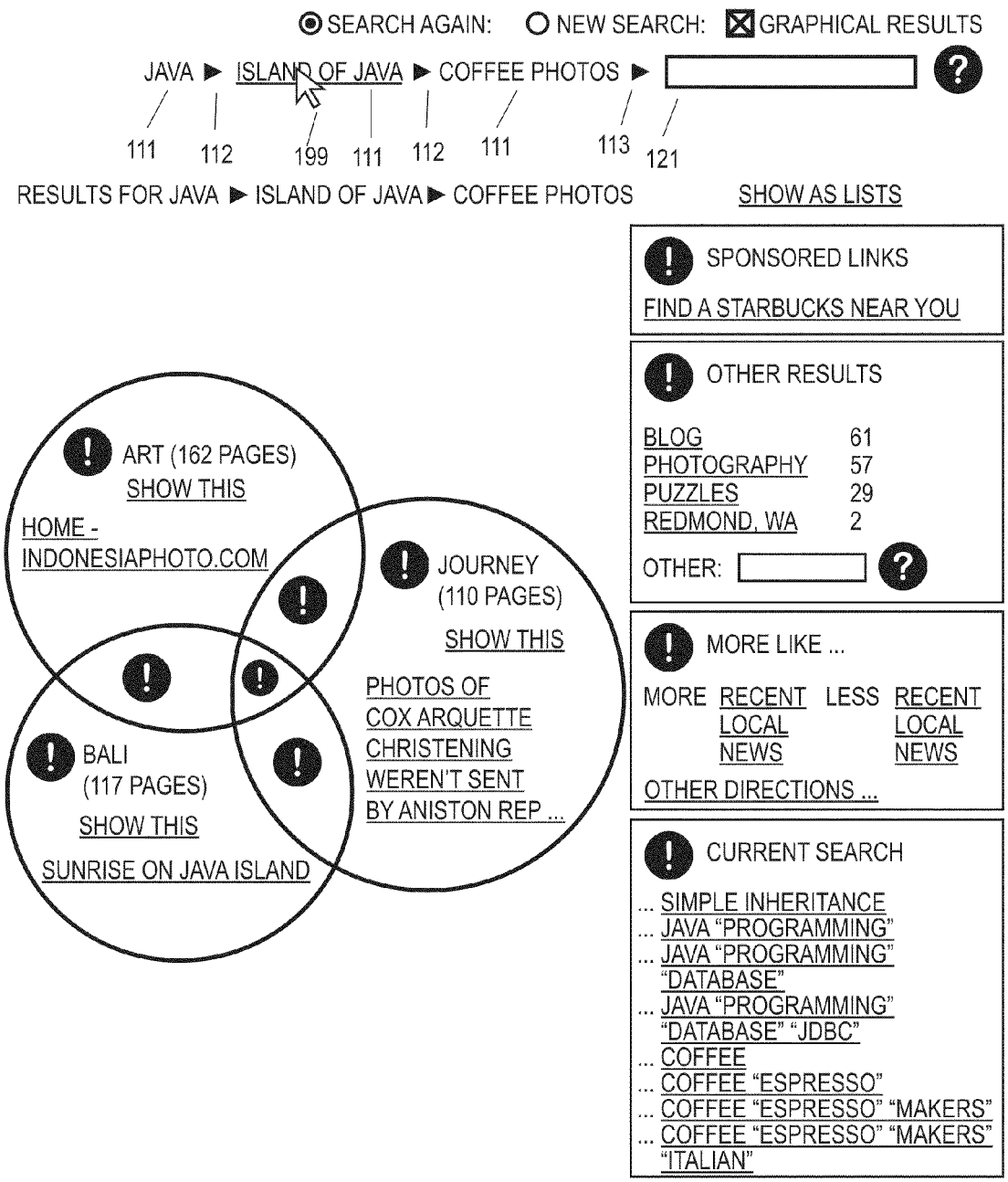
FIG. 12 is an example of search results using a Venn diagram viewer illustrating a link to a previous search in the sequence.

FIG. 12 illustrates exemplary search indicators 111 which show the search path used to reach the current search state. In this figure, the user has positioned their cursor 199 to click on one of the indicators in order to return to the corresponding search state. That indicator has been highlighted (underlined, in the figure) to indicate that the cursor is pointing at it.

Figure 13:
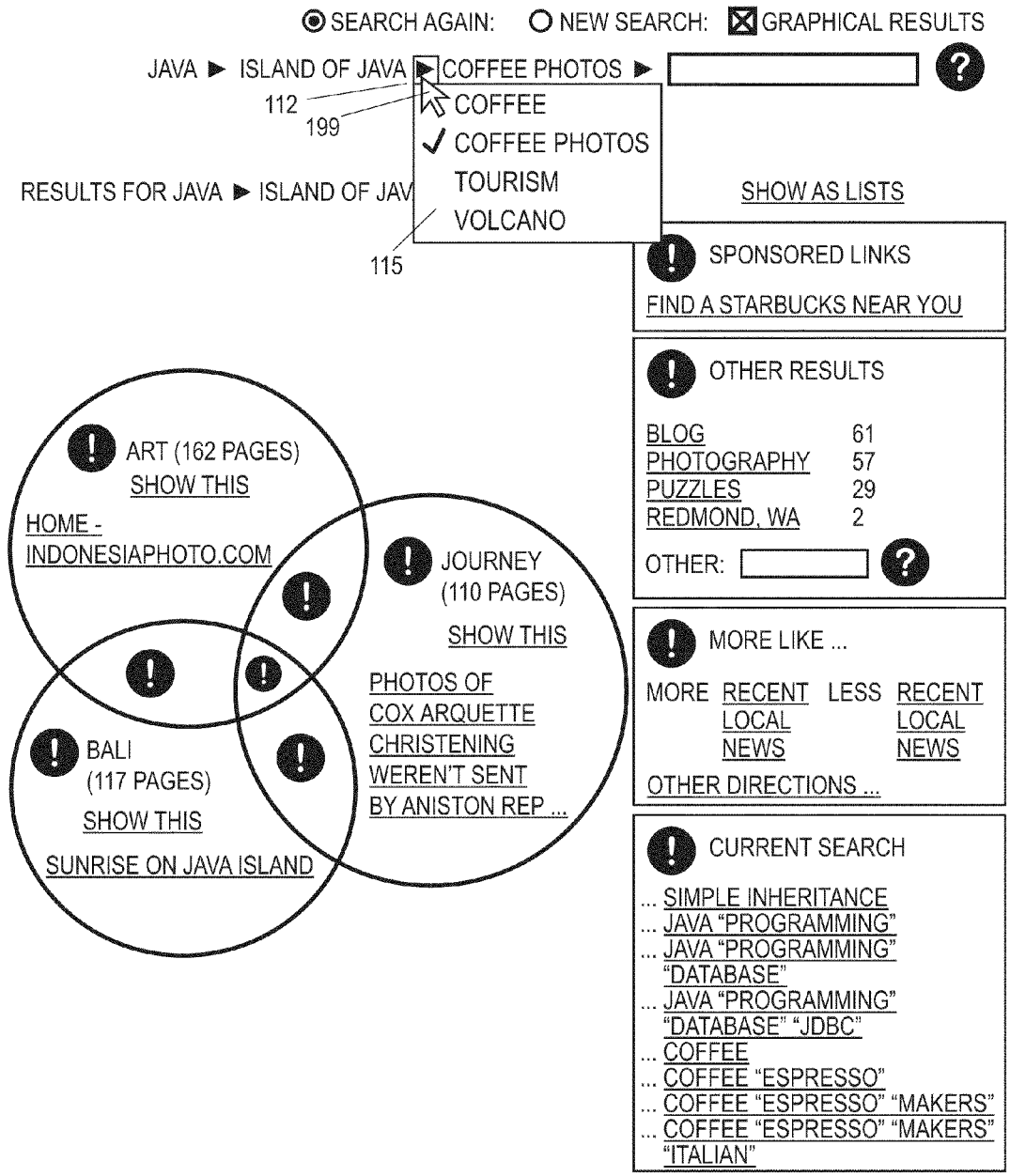

FIG. 13 illustrates an exemplary search indicator 112, at which the user has positioned their cursor 199 and clicked, in order to get a menu of alternate search subsets that they can switch to. The user can click on any indicator 112 or 113 to get such a menu.

Figure 18:
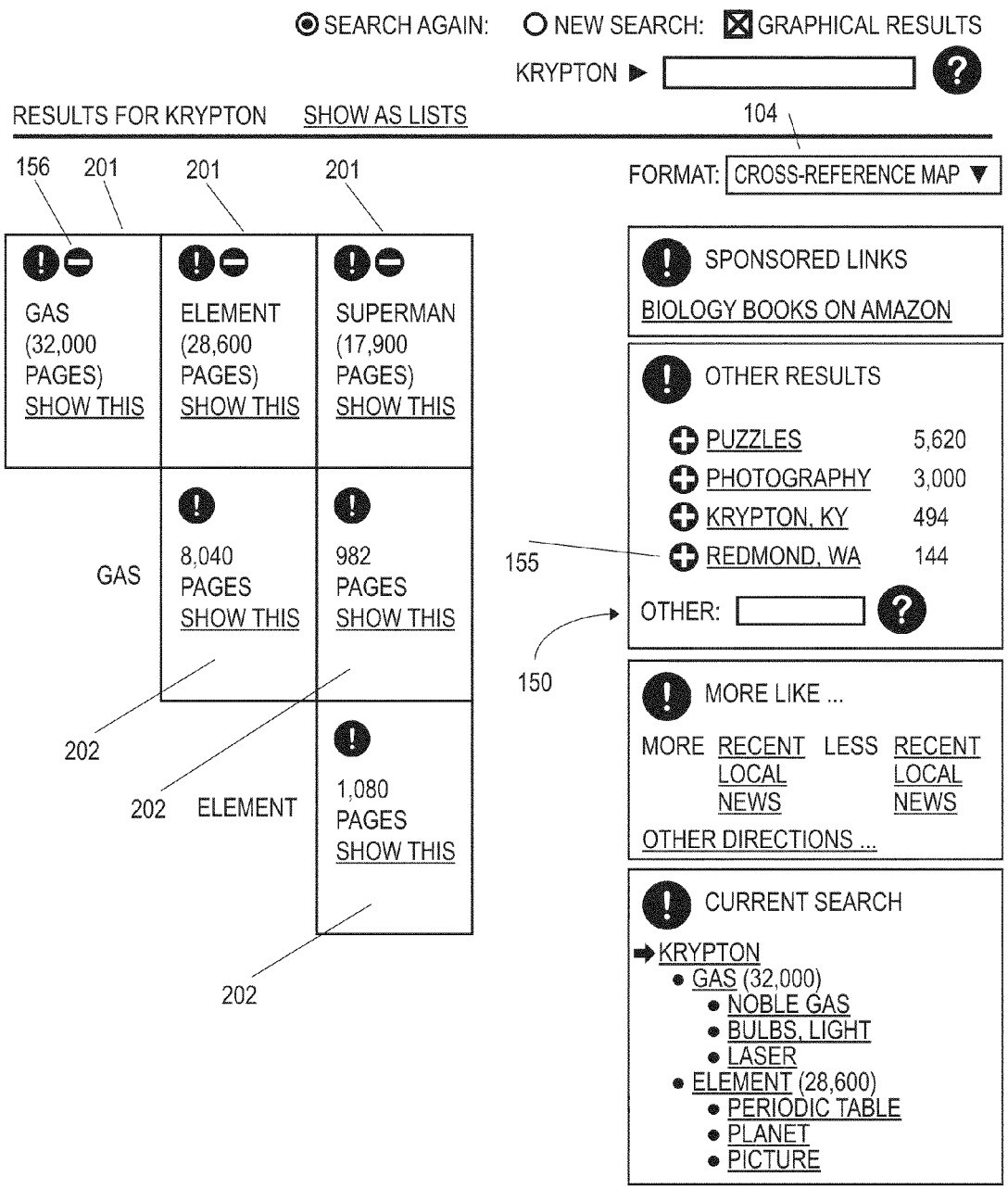

FIG. 18 shows an embodiment of a cross-reference map viewer 250. This viewer is also shown in FIGS. 19, 20, and 21. In FIG. 18, the viewer shows three subsets 201, which contain some or all of the features described above. In addition, the cross-reference map viewer shows all of the two-way intersection sets 202 for the currently shown subsets. Each intersection set contains some or all of the features described above.

Figure 27:
FIG. 27 is an example of search results using a List viewer illustrating a primary subset and alternate list.

FIG. 27 shows an embodiment of a list viewer 260. This viewer is also shown in FIGS. 28, 29 and 30B. In FIG. 27, the viewer shows a single subset 201, along with a collapsed complete set 203. The complete set, when expanded, shows a set of search results similar to that shown in prior art search engines. In FIG. 28, the viewer shows two subsets 201, along with a collapsed complete set 203. The subsets shown are chosen based upon the likelihood that they contain what the user is interested in.

FIG. 29 is similar to FIG. 28, but also shows a subset which is being shown based on the user's current search history, even though there are more results in other sets. This is indicated with an indicator 204.

Although the figures just described only show three types of viewers, anyone skilled in the art can see that alternate embodiments could use additional viewer types, as listed above.

Drill-Down Results

FIGS. 23 and 24 show the ability of a viewer to show a drill-down search results set 170 of search results overlaying a graphical viewer. The drill-down set is brought up when an icon 135 is clicked. The drill-down set includes a title 171, a link 172, which selects the set for further searching, and a close option 173, which closes the drill-down set, and a plurality of individual results 174. If one of the individual results is the item the user is searching for, they may navigate to it directly by clicking on it. FIG. 23 shows the drill-down search results set in front of the results shown in FIG. 22. FIG. 24 shows the drill-down search results set in front of the same results, but with the cross-reference map viewer.

Search History and State

Figure 31:
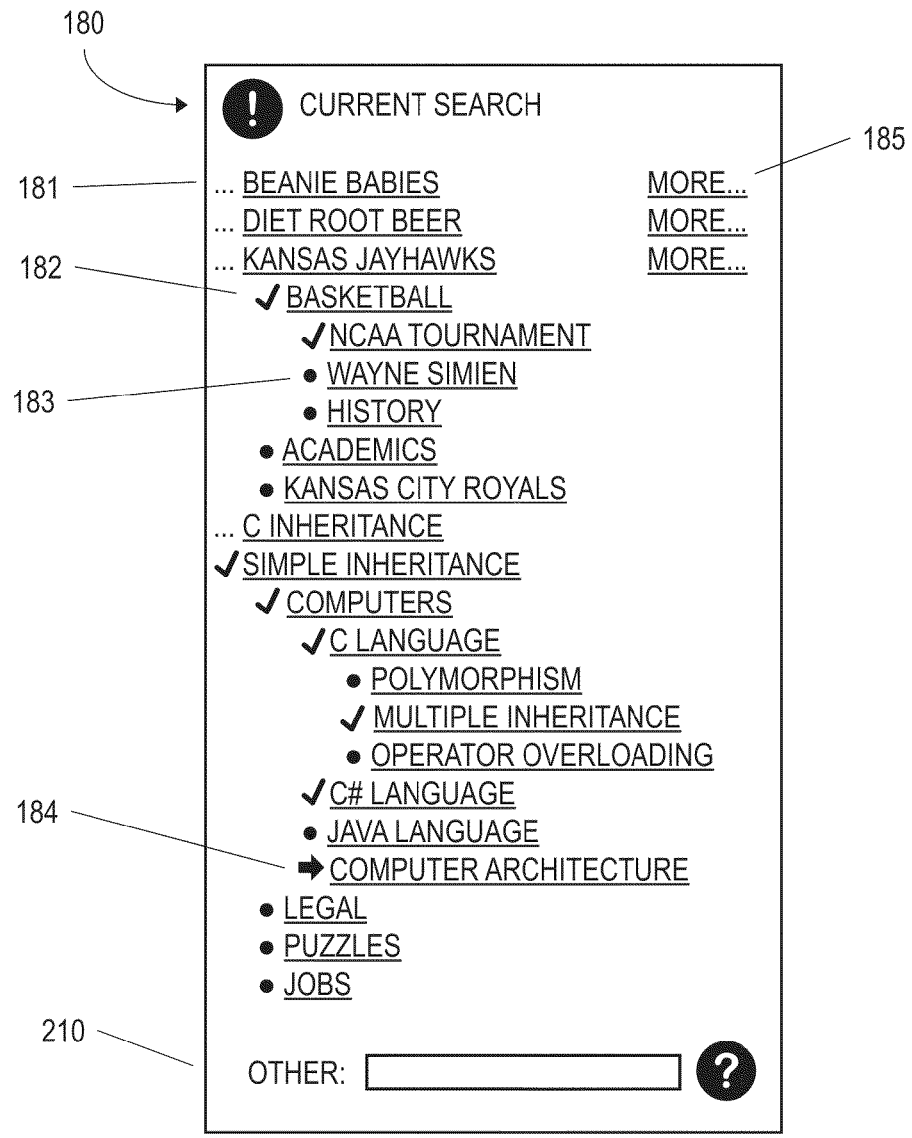
FIG. 31 is an example of a history tree showing current search history along with branches both taken and not taken.

FIG. 31 illustrates an embodiment of a search history tree 180 showing current search history along with branches both taken and not taken (illustrations of the search history also appears in other figures). The tree allows a user to quickly return to any part of the search, as well as to explore alternative avenues.

The history tree contains a list of history items 181, show in an indented tree structure. Items in the tree that have been visited or shown are indicated by a visited icon 182, while items that have not been visited are shown are indicated by a non-visited icon 183. The current subset or section of the tree being shown is indicated by a current icon 184. Some sections of the history may have a more button 185, which instructs the user interface to provide more detail for that portion of the history tree. The history may also include search options 210, which allows the user to manually specify an alternate subset for subsequent searching. The tree can also show indicators of how fruitful the system expects that portion of the search to be. One such indicator of potential fruitfulness is the size of that section of the tree, as shown in the history in FIG. 14 and other figures.

Any branch of the tree (whether previously taken or not) could be represented by any or all of, a name and/or description of the branch, an estimate of the size of the branch, a preview of one or more top pages in the branch, and a single page example (e.g., a thumbnail) of a top page in the branch. Different levels of the tree may be shown differently. For example, more detail may be provided at the current level.

The search history can also embody "session state" information. The concept of "session state" is a common one, but it has not previously been applied to search in this manner. An example of "session state" is a list of recently viewed items or a shopping cart on a sales web site. The session state contains: explicit session state (like shopping cart), implicit session state (axis in current n-dimensional search space), linear sequence, and possibly other data.

Conceptual Keywords

Figure 33:
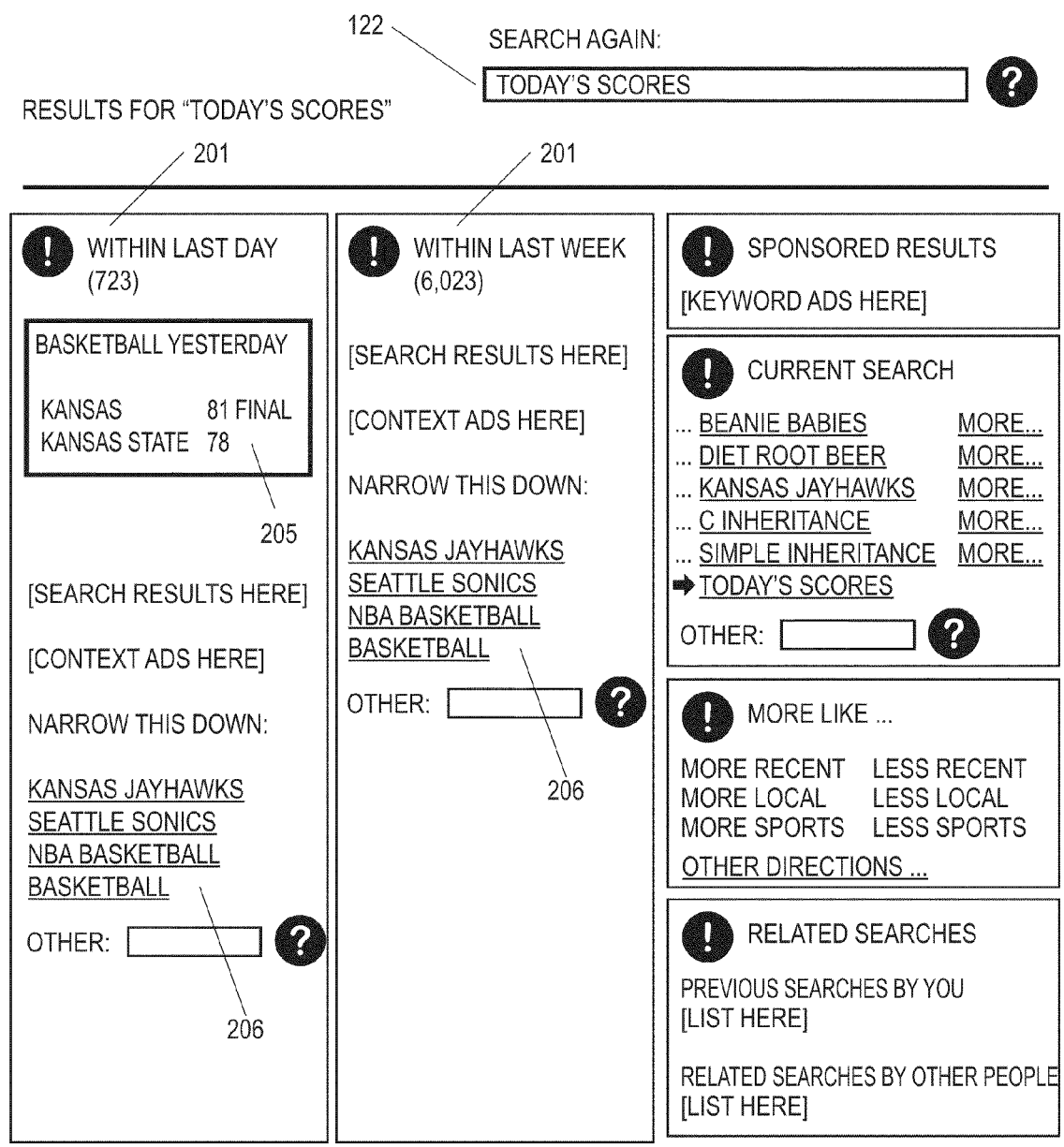
FIG. 33 is an example of result sets for a conceptual search, illustrating automatic categorization based on dates and pulled-up news information which is most likely to be of interest.

FIG. 33 illustrates an embodiment of the user interfaces that shows results for a conceptual search triggered by an appropriate search request 122. This exemplary search has categorized the search results based on dates into two subsets 201. The user interface has pulled-up a news blurb 205 (in this case an actual sports score) which is likely to be of interest based on the user's search, the search history, and the user's profile. It also shows specific proposed subsets 206, also based on the user's search, the search history, and the user's profile.

The preferred embodiment is a modification to a keyword-based or similar search which understands certain words in a query string as referring to concepts while allowing other words to continue to be keywords.

The query string is parsed to determine which words or subphrases, if any, are conceptual in nature. These words are then separated and the remaining keyword query string is combined with the conceptual search to perform an actual search.

Conceptual words and subphrases include, but are not limited to: Time words and phrases including, but not limited to today, tomorrow, yesterday, this week, next week, last week, this month, next month, last month, this quarter, next quarter, next quarter, this year, next year, next year, current, recent, future, past, next, last, a specific day, month, year, or date range; personal words and phrases including, but not limited to my, our; geographical words and phrases including, but not limited to local, nearby, this area; value words and phrases including, but not limited to interesting, expensive, cheap.

In systems which support conceptual search, each conceptual phrase is used to find relevant pages, which, in most cases, will not contain the conceptual words. For example, a search for "today" should find pages which are about today, such as a page describing an event that is occurring today, a news article about today, a news article that was published today, etc. A dynamically created mapping table similar in structure to the one shown in FIG. 34 is used to map concepts to multiple concrete search terms. The system uses heuristics, described elsewhere in this document, to determine which pages belong on a certain date or in a certain date range and then intersects that set with the keyword search.

The meaning of conceptual words and phrases are contextual and may have multiple simultaneous meanings. For example, for a person living in Redmond, Wash., "local" might be split into the meanings of "Redmond," "Seattle Area," and "Washington State." If the system has detected many queries for other geographical areas, it might define "local" to either be "Washington" or "Michigan," which might be appropriate for someone who has two homes or is planning a vacation.

The meanings of conceptual words and phrases may have layers of meanings. For example, the layers of meaning for "recent" might be "today," "this week", "this month," and "this year" and a plurality of these meanings might be used at any given time depending on the data available for the current search and/or how the phrase matches the currently-available information (e.g., the phrase "this March" has a subtly different meaning, and therefore different data in February than in May or August).

In systems which do not support conceptual search, multiple keyword query strings are constructed from the original query string to match the concept and then the resulting result sets are merged.

Improved Method of Searching

Figure 35:
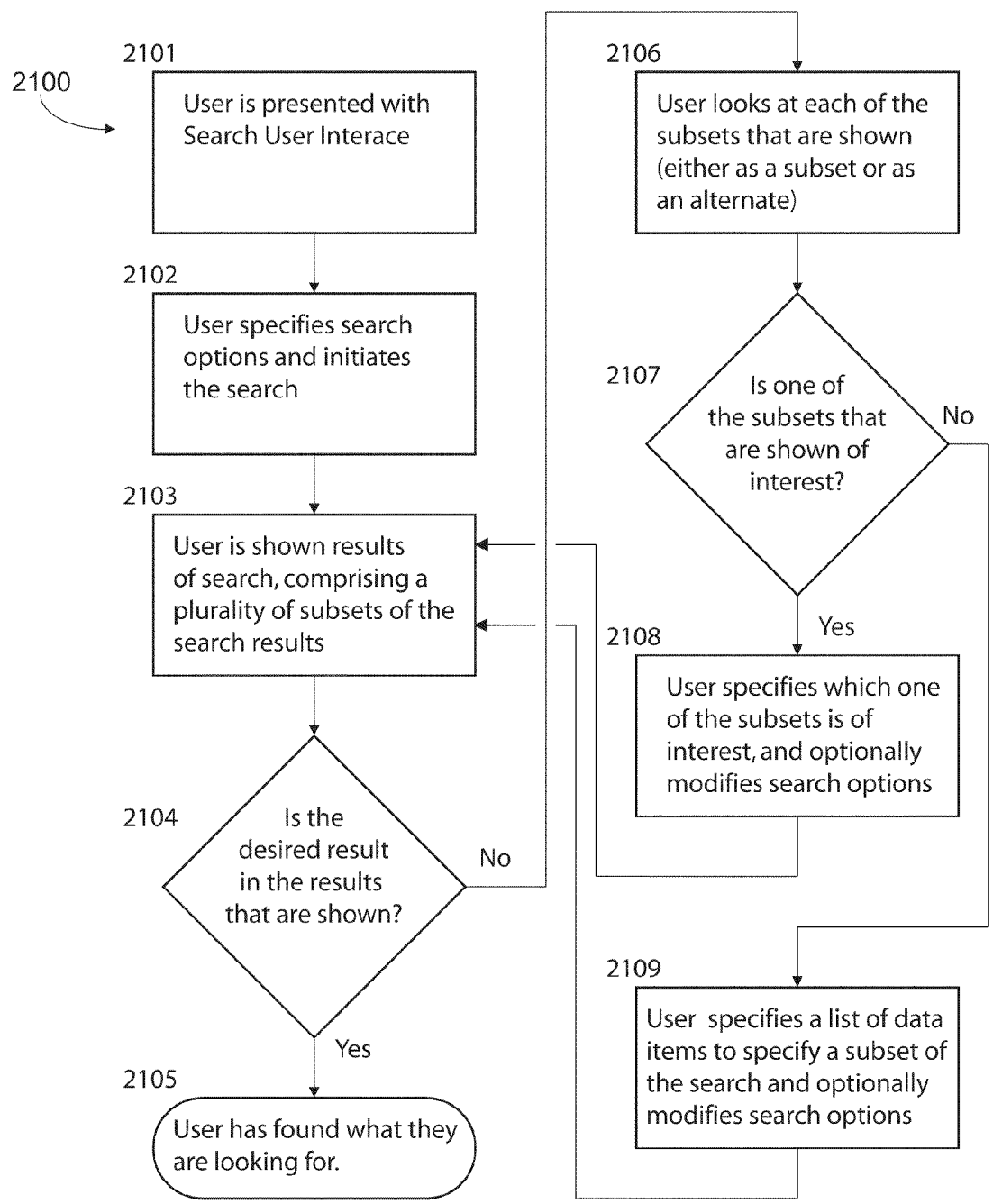
FIG. 35 is a logic flow diagram illustrating an exemplary process for searching.

FIG. 35 illustrates an exemplary process 2100 of the improved method of searching. In step 2101, the user is presented with a search user interface such as that shown in FIG. 24. In step 2102, the user specifies whatever search options they desire and they initiate the search. In step 2103, the user is shown the initial results of the search, which comprise a plurality of subsets of the complete search results. In step 2104, the user examines the search results and determines if the results that they are looking for are shown. If they are, the user completes the search in step 2105. Otherwise, in step 2106, the user looks at each of the subsets that are shown (either as a subset or as an alternate, as discussed elsewhere) and then, in step 2107, the determine if one of the subsets is of interest. If one of the subsets shown is of interest, the user specifies which one is of interest in step 2108, which causes them to return to step 2103, where they are shown a new set of search results. Otherwise, in step 2109, the user manually specifies a list of data items or options to specify a subset of the search, which also causes them to return to step 2103, where they are shown a new set of search results. In steps 2108 and 2109, the user may also modify previously-specified search options. The process repeats until the user finds what they were looking for and completes the search in step 2105.

Figure 9:
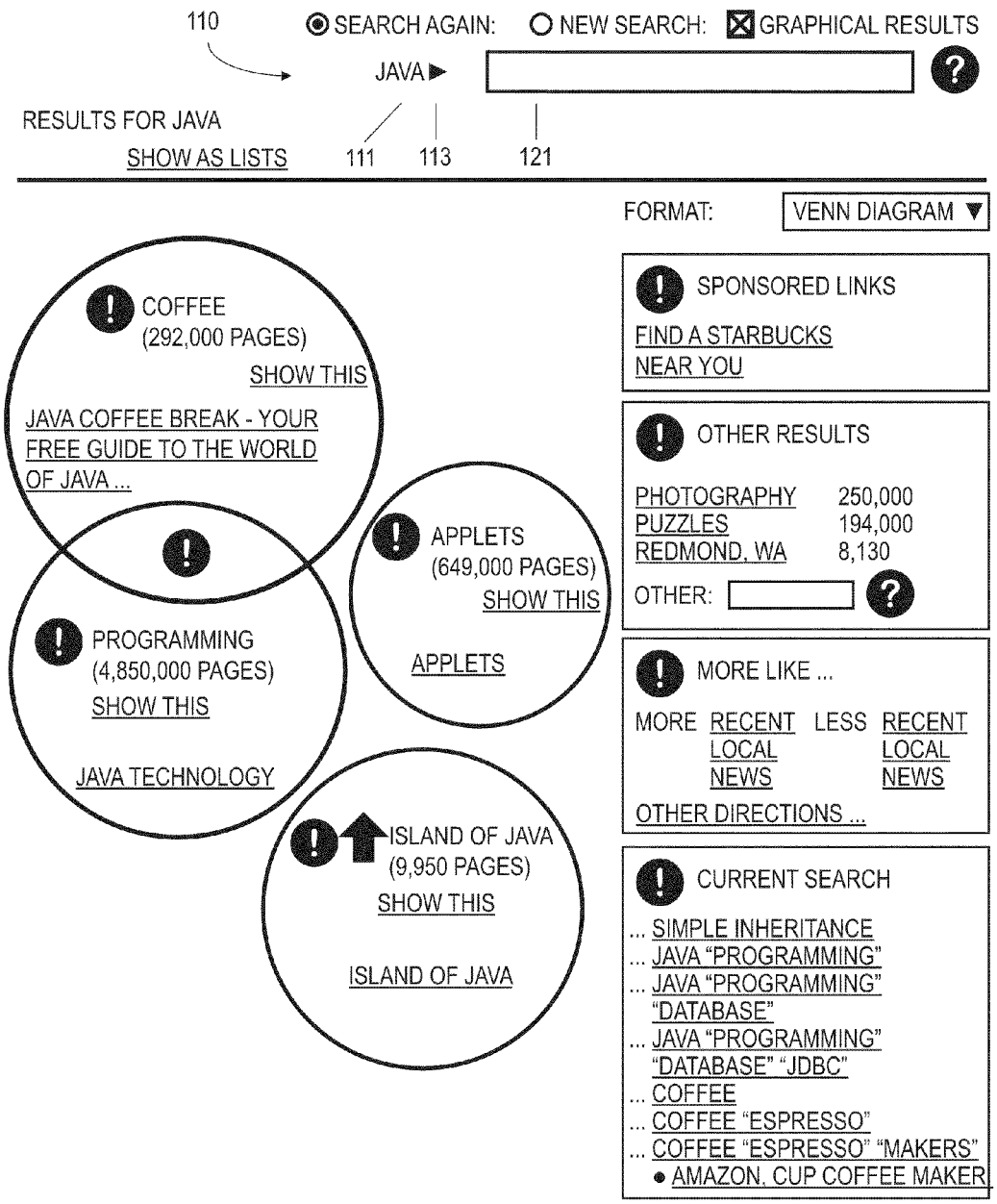
FIGS. 9, 10, and 11 are examples of search results using a Venn diagram viewer illustrating a sequence of a search, starting from a fairly general search and ending up with a pretty narrow search, with the search interface changing to reflect the depth of the search.
Figure 10:
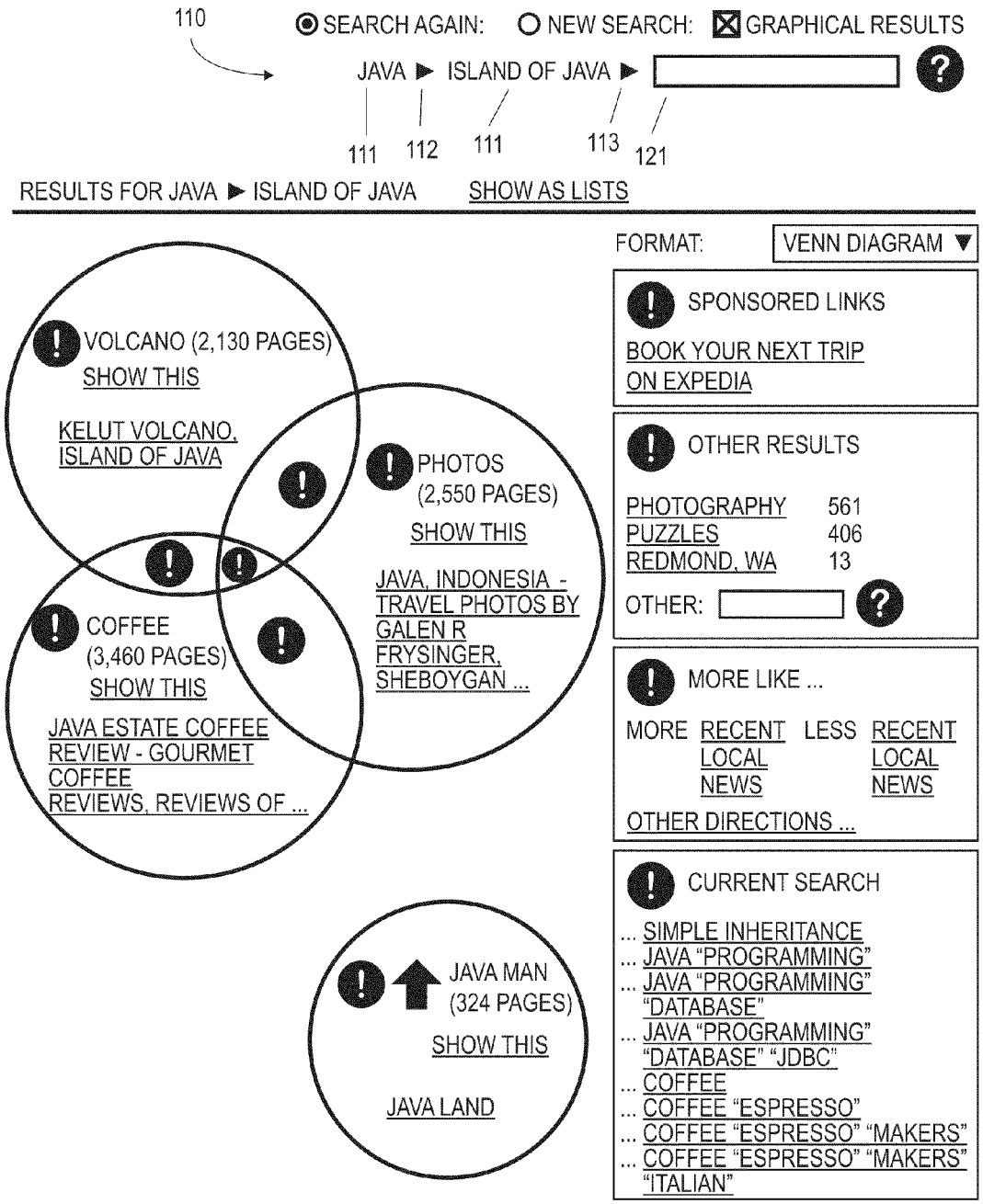
Figure 11:
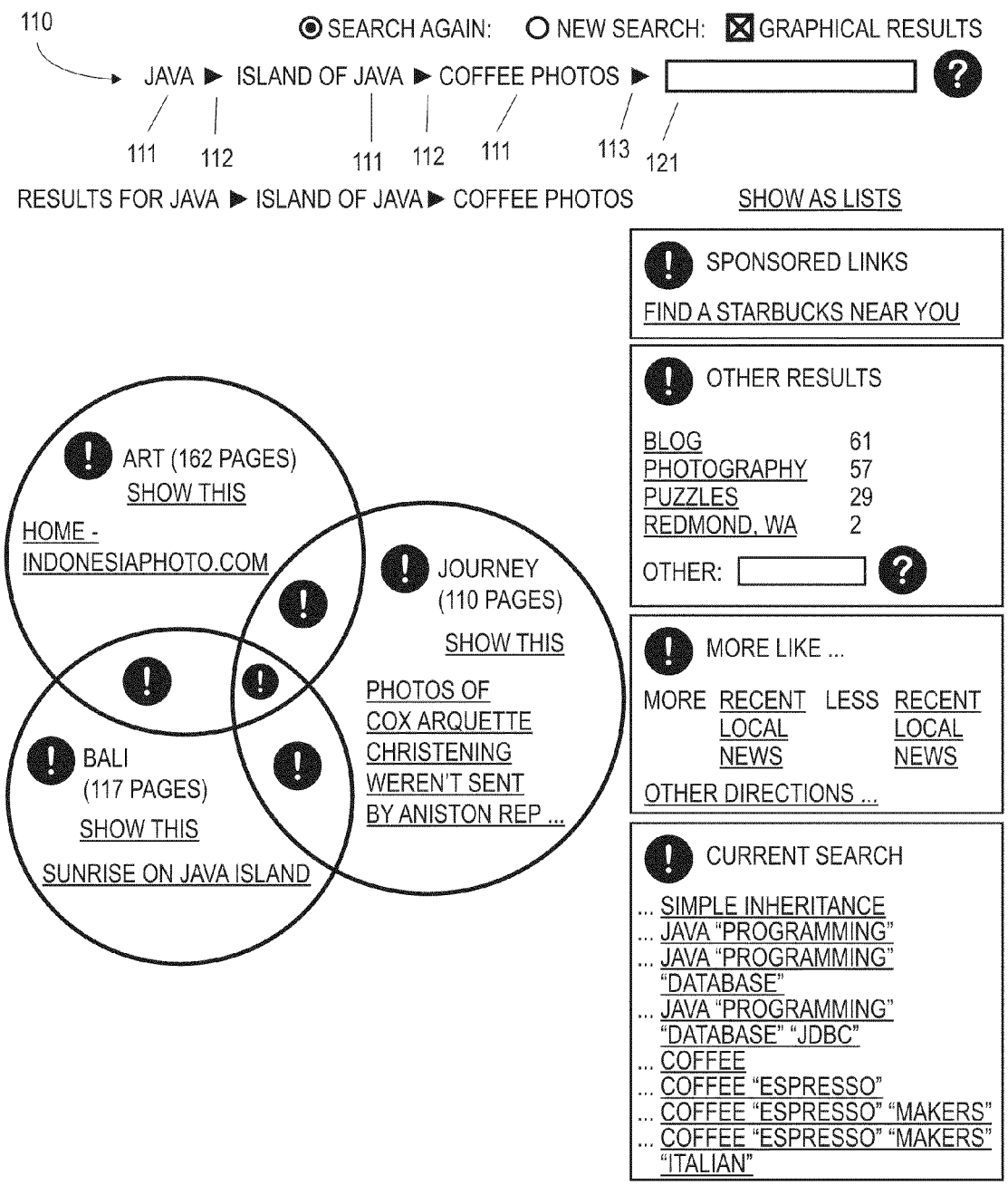

FIGS. 9, 10, and 11 illustrate an exemplary user interface presented during the use of process 2100. FIG. 9 shows exemplary results using a Venn diagram after has searched for "Java". The search form 110 shows a single indicator 111 and an indicator 113 to indicate the current search state. When the user indicates they want to explore the "Island of Java" subset, the interface shown in FIG. 10 is shown, in which an additional indicator 111 is shown, along with an indicator 112 separating the two indicator 111's. When the user subsequently indicates they want to explore the "Coffee Photos" subset, the interface shown in FIG. 11 is shown, in which a third indicator 111 is shown, along with a second indicator 112.

Figure 14:
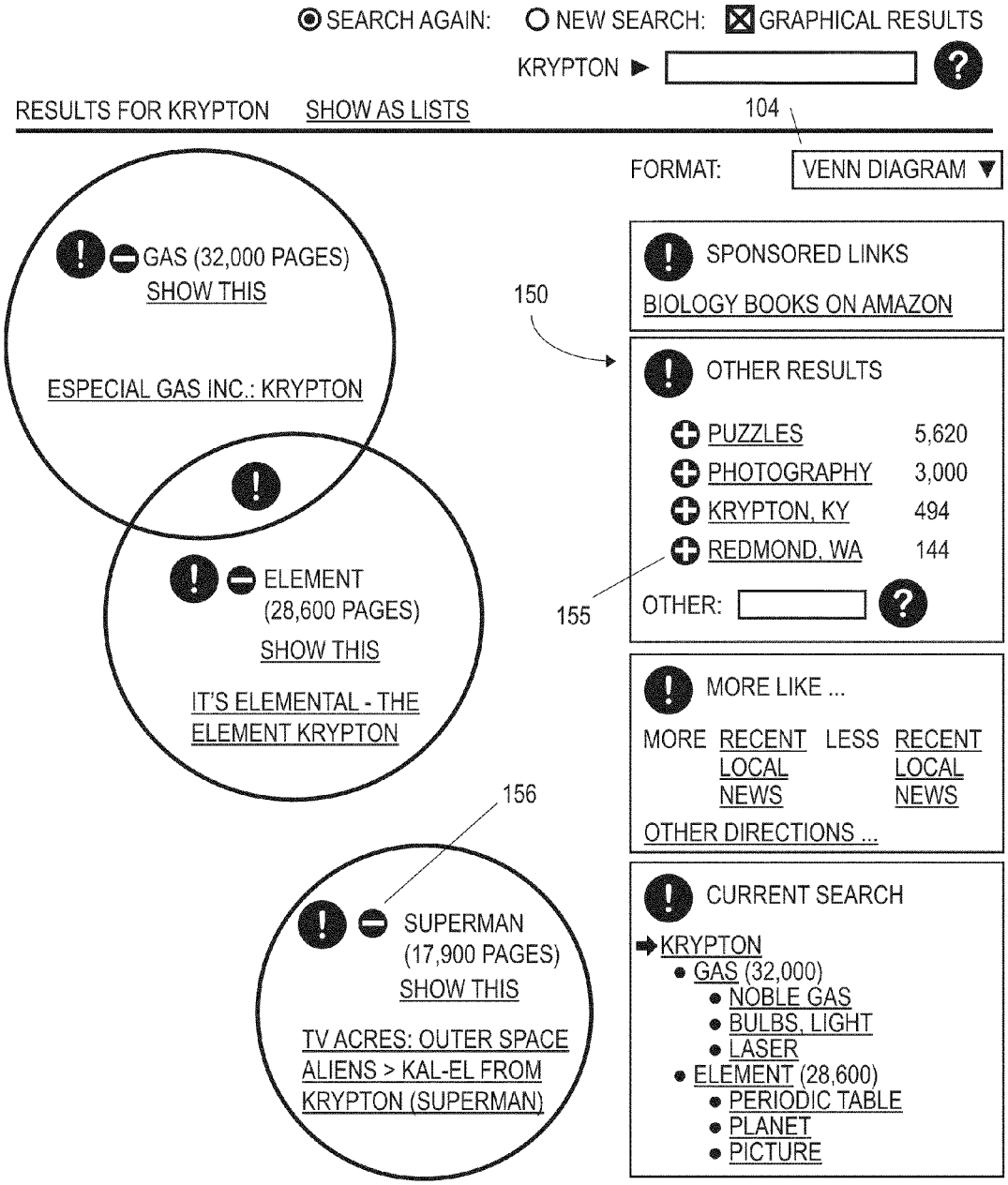

FIGS. 14, 15, 16, 17, 18, 19, 20, and 21 illustrate exemplary user interfaces in which the user can dynamically change viewer-related options without initiating a new search. Both FIG. 14 and FIG. 18 show that each of the result sets listed in the other results 150 has an add button 155, while each of the result sets shown in the viewer has a remove button 156. Clicking an add button immediately adds that result set to the viewer, while clicking a remove button immediately removes that result set from the viewer. In either case, the viewer rearranges its content to reflect the appropriate relationships between the currently-viewed result sets.

FIGS. 14, 15, 16, and 17 illustrate a sequence of exemplary user interfaces using the Venn diagram viewer that are presented while the user is using the add and remove buttons. In FIG. 14, the user has searched for "krypton". If the user uses the add button adjacent to the "puzzles" result set, the user interface in FIG. 15 is shown. Alternatively, if the user uses the add button adjacent to the "photography" result set, the user interface shown in FIG. 16 is shown. Subsequently, if the user uses the remove button for the "element" result set, the user interface in FIG. 17 is shown.

FIGS. 18, 19, 20, and 21 illustrate a sequence of exemplary user interfaces using the cross-reference map viewer that are presented while the user is using the add and remove buttons. In FIG. 18, the user has searched for "krypton". If the user uses the add button adjacent to the "puzzles" result set, the user interface in FIG. 19 is shown. Alternatively, if the user uses the add button adjacent to the "photography" result set, the user interface shown in FIG. 20 is shown. Subsequently, if the user uses the remove button for the "element" result set, the user interface in FIG. 21 is shown.

Note that the pairs of FIGS. 14 and 18, 15 and 19, 16 and 20, and 17 and 21 show the same results with a different viewer. A user can switch between the different viewers using control 104

Enterprise Search Servers

Another embodiment of the present invention is an "enterprise search server" containing search categorization information, normally for use within an enterprise or corporation.

User machines are configured to use the enterprise search server, such configuration to be by explicit assignment through a user interface, or through some prior art or future art automatic assignment technique such as DHCP or DNS, or a combination.

Whenever a user machine performs a search it can either (a) go through the enterprise search server, which proxies the search on behalf of the client, or (b) save search queries and results to the search server upon each search action or periodically (see elsewhere in this document for mechanisms for this).

Figure 36:
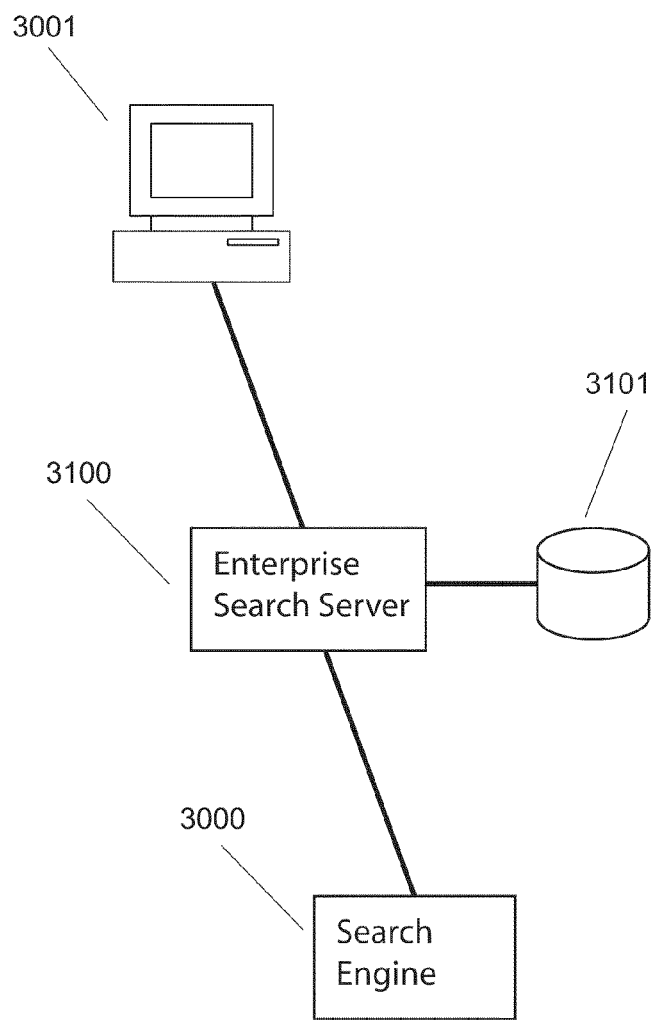
FIG. 36 shows a block diagram illustrating enterprise search servers using proxying.

FIG. 36 shows a block diagram illustrating an embodiment of an enterprise search engine used as a proxy. A user uses a device 3001 (usually a computer) to access the search engine. Their requests go to the enterprise search server 3100, which proxies the search to the actual search engine 3000. When the results are returned, the enterprise search server combines the results with the search engine results and returns them to the user. The enterprise search server also records all requests and results in a database 3101 for future use.

Figure 37:
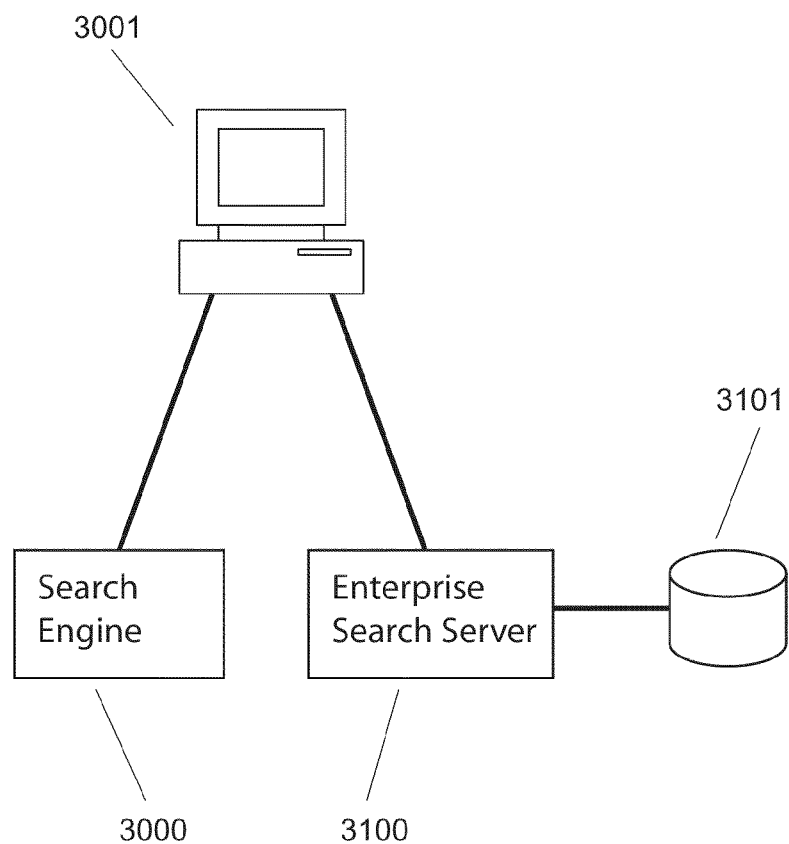
FIG. 37 shows a block diagram illustrating enterprise search servers without proxying.

FIG. 37 shows a block diagram illustrating an embodiment of an enterprise search engine without a proxy. A user uses a device 3001 (usually a computer) to access the search engine. Their requests go directly to the search engine 3000, but software on the device saves information about the search requests and results and periodically sends this information to the enterprise search server 3100, which records all requests and results in a database 3101 for future use.

In the case of proxying, the proxy could optionally be done automatically through the use of an alteration to an internal enterprise DNS server, through the modification of a hosts configuration file, or equivalent, or through some other method.

The search data saved to the enterprise search server is the same data described above, except the data is automatically categorized as being associated together by nature of being on the same enterprise search server.

The saved search results can be used, like user context information described above, to improve the quality of search results within the corporation. The more users there are that are using the search engine, the more the search results improve.

The enterprise search server has an optional direct connection to a corporate or enterprise search engine (e.g., a Google search appliance) so that it may prioritize and categorize internal search results. Results from the enterprise search engine are automatically categorized as being associated together, with appropriate categorization presented in the UI, but this categorization is not exclusive, and like other results described above, such results may be categorized in multiple ways.

Search results from the enterprise search engine can also be categorized along with results from other search engines.

Collaborative Public Search Servers

An alternate embodiment is a "collaborative public search server" containing search categorization information. Any entity can make available an enterprise search server to the public, allowing people to use that server as their "enterprise search server." For example, a club of people with common interests might make such a server available for club members. Users would automatically get an improved quality of search results over time through the common use of such a collaborative server. A user could use such a server on a permanent basis, or easily switch from one to another (or none) through a simple user interface.

Personal Search Servers

An alternate embodiment is a "personal search server," which is roughly equivalent to the "enterprise search server," but implemented for an individual. A typical implementation of a personal search server might be on an individual machine, with an interception to internet search sites. The personal search server could optionally treat a desktop search engine in the same way that the enterprise search server treats the enterprise search engine.

Public Enterprise Search Servers

An alternate embodiment is a system for public enterprise search engines on the internet to provide detailed search information to a search engine. The enterprise search engine provides a public API which may be used by the search engine. When a context for a search or section of a larger search is narrowed down to a specific enterprise, the public enterprise search engine API can be called to deliver the relevant search results. When a larger search needs results that are relevant to a specific enterprise, the public enterprise search engine API can be called to deliver the relevant search results, which are then integrated into the larger result set.

For example, take the car company Honda, which has a car named the Accord. There may exist many pages on Honda's web site which contain the word "accord," used as a noun or a verb, but are not about the Accord car. Honda's public enterprise search engine may have options set to handle this situation, but it can hardly be expected that an external search engine would know about such internal details of every potential enterprise. Similarly, every page on the Honda web site is about Honda in some way or another, whether or not such pages include the word "Honda" on them. By getting the contextual search results for Honda directly from Honda's public enterprise search engine, a public search engine can provide better results.

Figure 38:
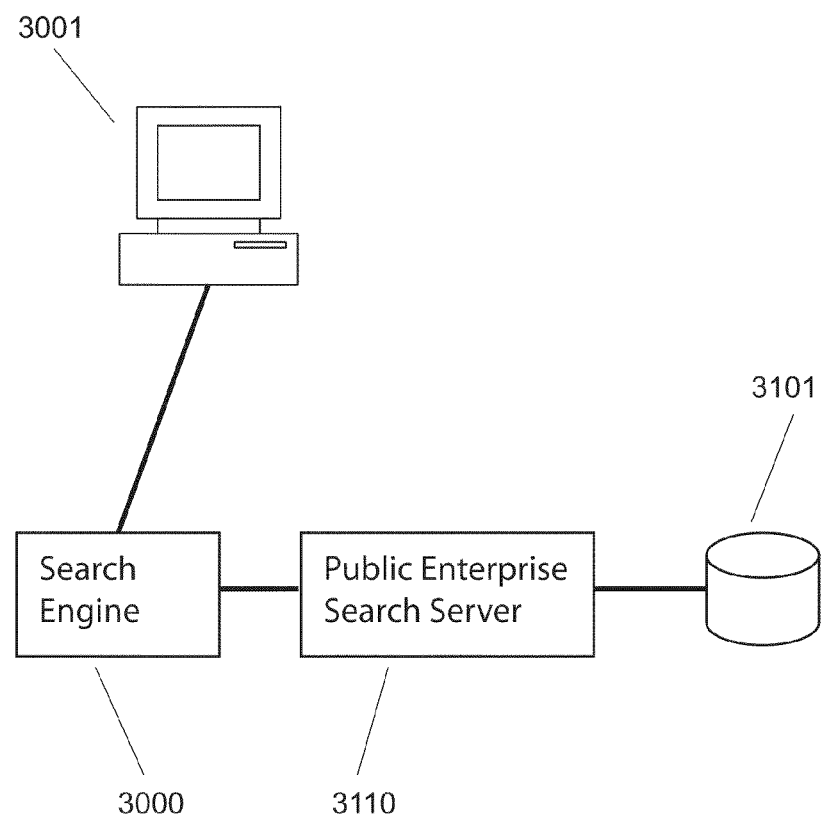
FIG. 38 shows a block diagram illustrating use of a public enterprise search server.

FIG. 38 shows a block diagram illustrating an embodiment of a public enterprise search engine. A user uses a device 3001 (usually a computer) to access the search engine 3000. When the search is narrowed down to a single enterprise, the search engine reroutes the request to a public enterprise search server 3110. The results are returned to the search engine which processes and formats the information and returns it to the user to be displayed.

Search Identity

Another embodiment of the present invention provides for a "search identity" and a mechanism for implementing it. The concept of "user identity" is a common one, but it has not previously been applied to search in this manner.

Any user of the search system has a search identity, essentially a login, with preference information associated with the login (as opposed to a machine, as in prior art). In addition to preference information, all learned information about the user is part of their search identity.

Learned Information may be manually edited.

A search identity can be published or "loaned out"—that is a user can create a search identity and perhaps manually edit it, then allow others to use it in a "read only" mode in which they benefit from the learning but their activity does not change the identity.

A search identity can be published in a variety of ways, but a particularly simple way is just to provide a search box on a web site that searches within your context. Such a search box might be particularly useful for blog and wiki pages, as well as company sites.

A published search identity could have public and private portions.

Users may have multiple search identities for different purposes. These identities could be linked or unlinked.

A search identity could be shared, for example, within a family. A single user can use multiple search identities at the same time. This yields some of the advantages of a personal search server, with the information stored by the search engine.

Improved Page Ranking

Another embodiment of the present invention is a mechanism for improving the quality of page ranking within a given rank dimension, using the following criteria.

Pages rank higher when they have valuable links to them.

A link is considered more valuable when the text around the link is relevant to the page that is linked, as determined by natural language or other processing of the surrounding text.

Pages with phrases on them that have essentially the same meaning as or similar meanings to the phrase or concept for the rank dimension receive a higher rank.

A link is considered more valuable when the text of the linked-to page is relevant to the page that it is linked from, as determined by natural language or other processing of the linked-to page.

A link which is not valuable for either of the above reasons, and is between non-homogenous pages (i.e., pages on different sites without similar content), can be considered a non sequitur link.

Pages rank higher when the text on them is cohesive and the links in them fit contextually, as determined by natural language or other processing of the relevant text.

Pages rank lower when they are linked to from many similar pages.

Pages rank lower when they contain multiple such non sequitur links and/or when they are linked to from non sequitur links.

Pages rank higher when they are related to or similar to pages that you have previously found to be interesting (this is not yes/no, but a continuum).

Improved User Experience on Non-Standard Devices

Another embodiment of the present invention is a search engine user interface that customizes itself based on the device it is displayed upon, without the need for any user preference information.

When any page from the search engine is queried, the browser string and other identifying information is examined to determine the originating device. This information is then used to determine which version of the search engine user interface is provided. For example, if a browser on a PDA or cell phone is used, a very limited UI is automatically provided, with no interaction on the part of the user. Prior art techniques required manual selection on the part of the user of a search engine. For example, a PDA user would have to select if they wanted to use a WAP browser or an HTML browser.

When the user clicks on a link to a web page in a result set, the search engine proxies the web page for the specific device, using heuristics to remap the contents of the page to a format appropriate for the destination device. This feature can also be used on its own to be able to reasonably view any web page on any device.

The link to the result on the results page is mapped to a proxy link, which points to the original page. The proxy server loads the real page, runs a heuristic mapping algorithm on the page, then returns the resulting page. Links are remapped to point to the proxy server. Pictures are removed, modified, and/or down-sampled as appropriate. Background pictures and colors are removed or simplified. Positioning of elements, sizes of tables, etc., are modified as appropriate. Unnecessary items, such as common headers, are removed. Hint comments within the page or linked style sheets are examined for any pertinent information on how the pages should be mapped.

Advertisements Based on Categories

Another embodiment of the present invention provides a method for displaying advertisements, links, or other information not directly found from the search results, based on the category or categories of the results returned.

Ads can be sold based on concept that users are searching for, not on keywords, and can be targeted better as users focus their searches Ads can be sold based on content of the results pages, rather than on the keywords used to find the pages.

Ads can be presented in context, within search results.

Ads can be sold based on what the search session of a user tells us about what they are looking for, rather than any specific search that a user has done, or any specific keywords they have entered. For example, a user shopping for luggage can be shown ads for a variety of brands of luggage or for sites that sell luggage, without any keyword matching being performed and without the risk of trademark infringement.

Ads placed on customer pages (as opposed to search engine pages) can be targeted based on the content of the page.

Advertisers can specify that their ads only appear on pages about particular topics (or not about particular topics) on a topic-by-topic basis, rather than just by keyword.

Does not prevent keyword ad sales (they can occur simultaneously).

Tracking Interesting Items

Another embodiment of the present invention provides for potentially "interesting" items on behalf of a user and a method for improving the quality of search results based on such interesting items, with information about the existing items added to the "search identity," as described above.

Unlike existing "favorites" and "bookmarks," there is a continuum of interesting items, roughly along the following lines: Known about (not visited), Uninteresting (but visited), Interesting, Favorite, Saved Link, Cache this Page Forever. Although this is described with discrete steps, the actual values need not be discrete.

A user can designate that a page belongs to one of the specified levels of interestingness at any time. The content of all interesting pages is automatically factored into the user's context information, with the interestingness of the page factoring into the relevance to the context.

With an enterprise search server, the content of all interesting pages is automatically factored into the enterprise context information, with the interestingness of the page factoring into the relevance to the context.

Every link from a visited page, even if not visited, can automatically be added to the "Known about" category and can therefore be searched on if by nothing else other than words within the link the text used to link to it.

Automatically Adding Interesting Items

Another possible embodiment provides for automatically adding to a user's collection of interesting items.

Any page which is looked at is ranked as to how interesting it is to the user by means of a heuristic function which takes a number of observable inputs. When a page is looked at, the time the user spends looking at it can be tracked. The more time is spent on the page, the more interesting it is. The more the user scrolls within the page, the more interesting it is. The correspondence need not be linear. For example, a page which is closed quickly is probably not interesting, so a page which is looked at for 10 seconds may be 10 times more interesting than a page which is only looked at for one second. However, a page which is looked at for 100 seconds may not be another 10 times more interesting than a page looked at for 10 seconds.

Some prior art technologies (e.g., screen readers for the blind) allow us to actually know exactly what was examined by the user. Future art may provide this functionality through eye tracking or other mechanisms. If such technology is available, the present invention can make use of it in the determination described above.

When a user clicks on a link within a page, the page can be considered more interesting. The link could be internal within the page, for a "Next" page, within the same site, or external to the site, and different interest values could be assigned to each of these. When a user clicks on an ad within a page, the page can be considered more interesting. User preferences could alter the heuristic for determining interest level from the variety of input factors.

With automatic tracking, additional levels beyond those described previously are possible, roughly along the following lines: Not visited, visited and uninteresting, visited and interesting, Favorite, Saved Link, Cache this Page Forever. Again, although this is described with discrete steps, the actual values need not be discrete.

An item of interest could be a section of a page, such as a section of a blog or wiki.

An item of interest could be an ad that was clicked on.

An item of interest could also be the transition from one page to another, i.e., the fact that a user clicked on a particular link on a particular page.

An item of interest could also be any document, file, or data item on a computer system, such as a word processing document, a calendar item, or an email message.

An item of interest could also be just a piece of text, an image, or other data, typed in, sent to the system via an email, instant message or similar mechanism, scanned in with a portable scanner, or presented to the system by some other means, or presented to a linked system, such as a review posted on Amazon.com or IMDB.com.

An item of interest could be any piece of personal data the user has stored on a machine or on the network, for example, their email or a hosted calendar.

Tracking Interesting Physical Items

Another embodiment of the present invention includes a mechanism by which physical items can be added to a user's collection of interesting items. The system for adding a physical item can be added to a user's collection of interesting item comprises:

A system for recognizing the appropriate code, id, name, or other identifying information for the item of interest (known as the Item Identifier). The preferred embodiment does not provide its own method of recognizing an item of interest and is capable of working with any prior art or future art recognition system, including, but not limited to, those methods described below.

Prior art provides a number of ways in which physical items can be identified, including, but not limited to, UPC codes, ISBN codes, ISSN codes, bar codes, RFID codes, library codes (such as Dewey Decimal or Library of Congress, or a proprietary technique), scanning of an embedded microchip, scanning of text (including handheld scanners with immediate or delayed recognition and/or upload), and image, shape or pattern recognition.

Prior art provides a number of ways in which people, animals, plants, and other living things can be identified, including, but not limited to, social security numbers, driver license numbers, face recognition software, fingerprint identification, iris recognition, DNA analysis, and scanning of an embedded microchip.

Prior art provides a number of ways in which locations can be identified, including, but not limited to, specification by name or address, specification by location on a real or virtual map, specification by way of directions to a particular location, identification of GPS coordinates (latitude, longitude, and, optionally, altitude), calculating a location based on a beacon or beacons (such as an FAA beacon), and scanning of a microchip or other device present at the location.

A particular item may be identified in more than one way. For example, a library book might have an ISBN code, a library code, and an embedded RFID chip.

A mechanism to input the Item Identifier into the system. The mechanism may have different components which function at different times. For example, a mobile handheld scanner could be used to recognize bar codes or ISBN numbers, and the scanner could periodically be connected to a computer system. Or, a cell phone could have RFID detection technology built in, with the cell phone automatically transmitting the information to a central store for relay to the system.

A mechanism to optionally allow the user to specify the level of interest in the item, and an optional mechanism to use a default level of interest in the event that the user does not specify it.

A software algorithm which takes the Item Identifier and stores it along with the level of interest and possibly other information, in the appropriate location, such as a database record.

An item of interest could also be a book bought or checked out from a library, a place visited, an item bought at a real or online store or auction site, or any other object for which the user's interest in it can be inferred based on an activity performed by the user.

Improved Searches from Tracked Interesting Items

Another embodiment of the present invention includes a mechanism whereby a collection of interesting items, each with a potential rank of relevance and/or importance can be turned into a learned set of user information which can be used to improve the quality of searches.

Data is examined for connections between words, both semantic (based on a knowledge base) and lexical within the data items.

One or more webs of connections are created based on the discovered connections. Whenever a search term, or a corrected search term, or a synonym of a search term matches an item in the web, the connections are used as an adjunct to the global knowledge base, to determine what other searches might be of interest.

Locating an Application Dependent File

Another embodiment of the present invention provides a mechanism for automatic discovery of the location of an application-dependent file within a local file system. Many applications require a local configuration file or other files and search applications, in particular, require a large database file. Applications generally use a fixed location for the local file, but some applications allow you to move the file by specifying a location (or in some cases, a particular hard disk drive, but not the location on that drive). In the present invention, if the application does not find the file or files in the expected location when the application is launched, it searches the local file system until it finds it, and then updates its pointer record of where the file is. The location of this pointer record is the only thing that can't be changed and it would be stored in a fixed location, as a local file in the application's own directory, a system registry key, or a similar location.

Normally (and in the preferred embodiment), in order to speed up the startup process, the application will update the pointer record containing the location of the file whenever it has moved to a new location. If this pointer record is lost, damaged or simply out of date, the application will function without it, searching for the file.

Normally (and in the preferred embodiment), the application would locate and adjust to the new location of the file(s) without any user interaction. However, in some cases, it may be desirable to tell the user by means of a dialog box that the user has to click a button in to confirm, or by a subtle notification that requires no confirmation. The application might display the location When an application has multiple files, the files could all be in the same location, or they could be in separate locations, with this mechanism being used multiple times in the latter case.

When an application has multiple files in different locations, the pointer record might only point to the first or primary file and that file might contain the locations of other files.

There may be more than one fixed location for the pointer record. For example, a short list of locations might be provided and that list might be searched, in some order, to see if any of them had the pointer record. The record would then point to the actual location of the file(s). This technique might be useful, for example, in the case where Some applications today store some data files (e.g., dictionaries) within the application directory (Program Files in Windows) or in some other unusual location, but this means that these data files are not automatically backed up along with the user's documents. Microsoft Outlook is an example of such an application. By allowing the user to simply move the files, backups work properly. If the application is reinstalled, the only thing missing is the pointer record, which can be recreated by a search at install time. In this case, the user may need to be asked a question to verify that the proper action is being taken, but, since question can be asked after the entire disk has been searched and any and all locations of data files have been identified, the question presented to the user can be simple and understandable.

The obvious prior art method for solving this problem is to have a user-configurable option which specifies the location of the file. This method can be integrated with the present invention in several ways: as a way to set a default for the method of the present invention, as an override to the method of the present invention, as a temporary override to the method of the present invention (until the application-dependent file is missing again), or some other method.

Another embodiment of the present invention provides a mechanism for automatic discovery of the location of an application-dependent file which is stored on the internet instead of on a local file system, using a similar process to that described above, but with some additional capabilities:

When the application discovers that the file is not in the expected location, it would normally (and in the preferred embodiment) query a web service first for the new location of the file before searching for it.

The application might cache a copy of the file on the local file system, for possible use if the file cannot currently be found on the internet. The preferred embodiment does this.

Another embodiment of the present invention provides a method of integrating search results from a plurality of networks. For example, a user inside a corporation could do a single search which would return an integrated result set from both internal and external sources. The method can incorporate any number of distinct internal and distinct external sources.

The sources of the items in such a search result set is a clearly desirable axis for display of the search results, but the true power of such a search with such an integrated result set is that other axes can be used and within each area within an axis, results from all sources can be shown.

Anyone skilled in the art will appreciate that the above-described mechanisms for locating files can apply to any configuration change of any file, not just an application-dependent file.

In an ideal system, users can rearrange any files at any time and the system just knows where they are.

The invention claimed is:

1. A computer-implemented method of providing web search results, the method comprising:

receiving, by a search server, a search request from a client device, said search request comprising at least one search term;

determining, by said search server, a multiplicity of search results according to said search request;

categorizing, by said search server, said multiplicity of search results into at least a first categorical subset and a second categorical subset, said first categorical subset grouping together a first plurality of search results characterized according to a first category, said second categorical subset grouping together a second plurality of search results characterized according to a second category;

determining an intersection subset comprising an intersection plurality of search results that are included in both of said first and said second categorical subsets;

providing, by said search server for display on said client device, a first results user interface comprising:
- said first categorical subset of search results, arranged into a first visually distinct group;
- said second categorical subset of search results, arranged into a second visually distinct group; and
- said intersection subset of search results, arranged into a third visually distinct group;
- said results user interface further including a plurality of controls for respectively specifying at least an interesting one of said first categorical subset, said second categorical subset, and said intersection subset;

receiving, by said search server, an indication from said client device to drill down into an indicated one of said first categorical subset, said second categorical subset, and said intersection subset; and in response to receiving said indication, providing, by said search server for display on said client device, a second results user interface comprising at least some search results of said indicated subset;

wherein receiving said search request comprises:
- receiving a partial search term from said client device; and
- prior to receiving a completion search term to complete said partial search term:
  - predicting a first set of relevant categories associated with said partial search term;
  - providing said first set of relevant categories for display on said client device;
  - receiving a modification to said partial search term from said client device;
  - predicting a second set of relevant categories associated with said modified partial search term, said second set of relevant categories differing from said first set of relevant categories; and
  - providing said second set of relevant categories for display on said client device.

2. The method of claim 1, wherein said first category comprises a first date range of at least one day, and wherein said first plurality of search results are grouped together in said first categorical subset according to said first date range.

3. The method of claim 2, wherein said second category comprises a conceptual category associated with a concept, and wherein said second plurality of search results are grouped together in said second categorical subset according to said concept.

4. The method of claim 1, further comprising categorizing said multiplicity of search results into a third categorical subset, said third categorical subset grouping together a third plurality of search results characterized according to a third category, said third categorical subset having no intersection with either of said first and second categorical subsets.

5. The method of claim 1, wherein said first results user interface further comprises a control for requesting a third plurality of search results selected from said multiplicity of search results, said third plurality of search results being selected to be more like at least one of said first category and said second category.

6. The method of claim 1, wherein said first results user interface further comprises a control for requesting a third plurality of search results selected from said multiplicity of search results, said third plurality of search results being selected to be less like at least one of said first category and said second category.

7. The method of claim 1, wherein said first category is associated with a geographical area, and wherein said first plurality of search results are grouped together in said first categorical subset according to said geographical area.

8. The method of claim 7, further comprising determining a local geographical location associated with said search request from said client device.

9. The method of claim 7, wherein said first results user interface further comprises at least one of a second and a third control for respectively requesting a second and a third plurality of search results selected from said multiplicity of search results, said second plurality of search results being selected to be more relevant to said local geographical location, said third plurality of search results being selected to be less relevant to said local geographical location.

10. The method of claim 1, further comprising determining a synonymic set of search terms equivalent to said at least one search term.

11. The method of claim 10, wherein determining said multiplicity of search results comprises searching an index according to said at least one search term and each of said synonymic set of search terms.

12. The method of claim 10, wherein said synonymic set of search terms includes at least one of a group consisting of: a misspelling of said at least one search term, and an alternate spelling of said at least one search term.

13. The method of claim 1, further comprising identifying a concept associated with said at least one search term, and wherein determining said multiplicity of search results comprises searching an index according to said concept.

14. The method of claim 1, further comprising identifying a concept associated with said at least one search term, and wherein determining said multiplicity of search results comprises searching an index according to said concept rather than according to said at least one search term.

15. The method of claim 1, further comprising separating said at least one search term into a conceptual portion and a literal keyword portion, and wherein determining said multiplicity of search results comprises concept-searching an index for search results conceptually related to said conceptual portion, and keyword-searching said index for search results including said literal keyword portion.

16. The method of claim 1, wherein:
- said first visually distinct group comprises a first regular boundary, depicted in said first results user interface, and within which at least some of said first plurality of search results are displayed;
- said second visually distinct group of said first results user interface comprises a second regular boundary, depicted partially overlapping said first regular boundary in said first results user interface, and within which at least some of said second plurality of search results are displayed; and
- said third visually distinct group comprises a partially overlapping portion of said first and said second regular boundaries, within which at least some of said intersection plurality of search results are displayed.

17. A server apparatus including a processor and a memory storing instructions that, when executed by the processor, configure the server apparatus to perform the method of claim 1.

18. A non-transient computer-readable storage medium having stored thereon instructions that, when executed by a processor, configure the processor to perform the method of claim 1.

* * * * *